US011222621B2

(12) United States Patent
Battenberg et al.

(10) Patent No.: US 11,222,621 B2
(45) Date of Patent: Jan. 11, 2022

(54) VARIATIONAL EMBEDDING CAPACITY IN EXPRESSIVE END-TO-END SPEECH SYNTHESIS

(71) Applicant: Google LLC, Mountain View, CA (US)

(72) Inventors: Eric Dean Battenberg, Sunnyvale, CA (US); Daisy Stanton, Mountain View, CA (US); Russell John Wyatt Skerry-Ryan, Mountain View, CA (US); Soroosh Mariooryad, Redwood City, CA (US); David Teh-hwa Kao, San Francisco, CA (US); Thomas Edward Bagby, SanSan Francisco, CA (US); Sean Matthew Shannon, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/879,714

(22) Filed: May 20, 2020

(65) Prior Publication Data
US 2020/0372897 A1 Nov. 26, 2020

Related U.S. Application Data

(60) Provisional application No. 62/851,879, filed on May 23, 2019.

(51) Int. Cl.
G10L 15/22 (2006.01)
G06N 3/00 (2006.01)
(Continued)

(52) U.S. Cl.
CPC ............ G10L 13/047 (2013.01); G10L 13/10 (2013.01)

(58) Field of Classification Search
CPC ............. G10L 13/08; G06N 3/00; G06N 3/08
See application file for complete search history.

(56) References Cited

U.S. PATENT DOCUMENTS 9,431,006 B2 * 8/2016 Bellegarda .............. G10L 15/14
10,068,557 B1 * 9/2018 Engel ...................... G06N 3/04
(Continued)

OTHER PUBLICATIONS

Eric Battenberg et al: "Effective Use of Variational Embedding Capacity in Expressive End-to-End Speech Synthesis", arxiv.org, Cornell University Library, 201 Olin Library Cornell University Ithaca, NY 14853, Jun. 8, 2019 (Jun. 8, 2019), XP081510534, pp. 2-5.

(Continued)

Primary Examiner — Shreyans A Patel
(74) Attorney, Agent, or Firm — Honigman LLP; Brett A. Krueger; Grant Griffith

(57) ABSTRACT

A method for estimating an embedding capacity includes receiving, at a deterministic reference encoder, a reference audio signal, and determining a reference embedding corresponding to the reference audio signal, the reference embedding having a corresponding embedding dimensionality. The method also includes measuring a first reconstruction loss as a function of the corresponding embedding dimensionality of the reference embedding and obtaining a variational embedding from a variational posterior. The variational embedding has a corresponding embedding dimensionality and a specified capacity. The method also includes measuring a second reconstruction loss as a function of the corresponding embedding dimensionality of the variational embedding and estimating a capacity of the reference embedding by comparing the first measured reconstruction loss for the reference embedding relative to the second measured reconstruction loss for the variational embedding having the specified capacity.

20 Claims, 14 Drawing Sheets

(51) Int. Cl.
*G06N 3/08* (2006.01)
*G10L 13/047* (2013.01)
*G10L 13/10* (2013.01)

(56) References Cited

U.S. PATENT DOCUMENTS

| | | | |
|---|---|---|---|
| 2007/0217626 A1* | 9/2007 | Sharma | G06T 1/0028 381/100 |
| 2009/0177465 A1* | 7/2009 | Johansson | G10L 19/24 704/219 |
| 2018/0096677 A1* | 4/2018 | Pollet | G06N 3/0454 |
| 2019/0251952 A1* | 8/2019 | Arik | G10L 13/033 |

OTHER PUBLICATIONS

Zhang Ya-Jie et al: "Learning Latent Representations for Style Control and Transfer in End-to-end Speech Synthesis", ICASSP 2019—2019 IEEE International Conference on Acoustics, Speech and Signal Processing (ICASSP), IEEE, May 12, 2019 (May 12, 2019), pp. 6945-6949, XP033566176, DOI: 10.1109/ICASSP.2019. 8683623 [retrieved on Apr. 4, 2019].

International Search Report and Written Opinion for the related Application No. PCT/US2020/033881, dated Aug. 19, 2020.

* cited by examiner

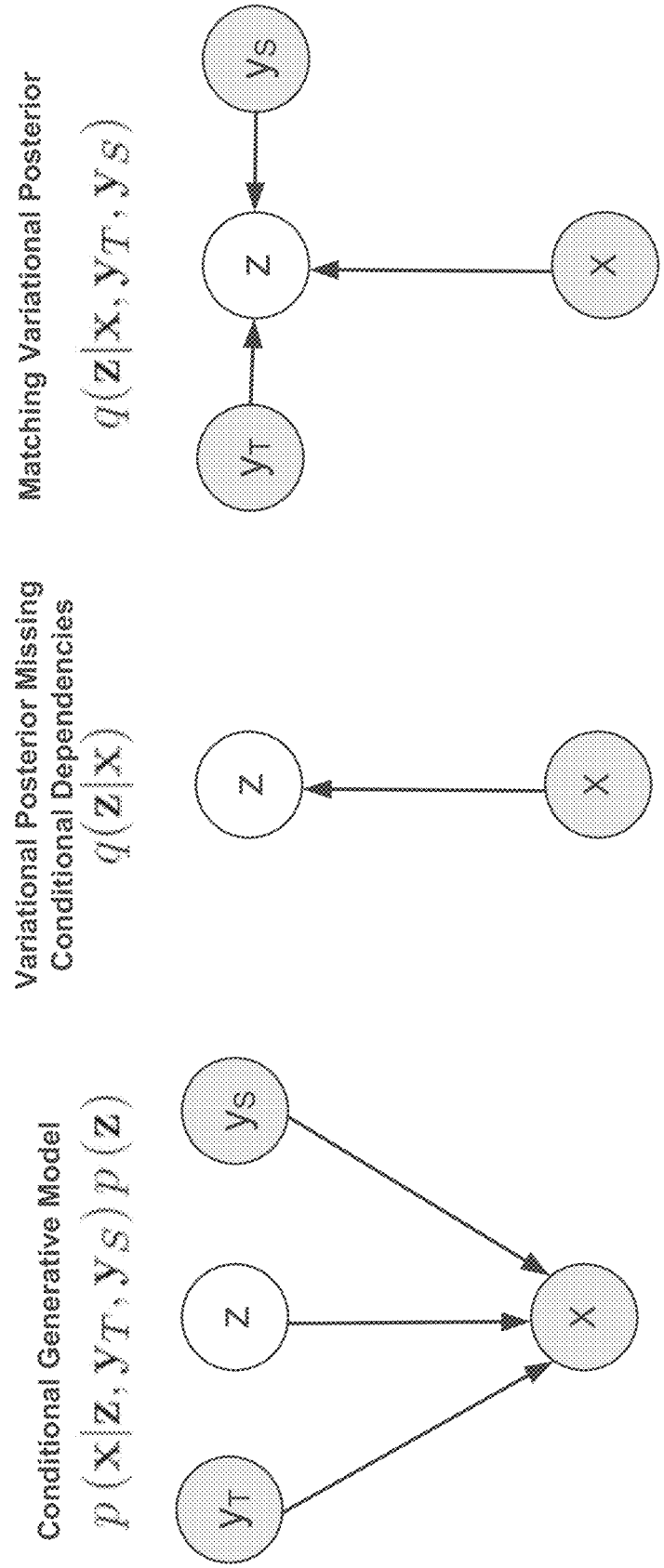

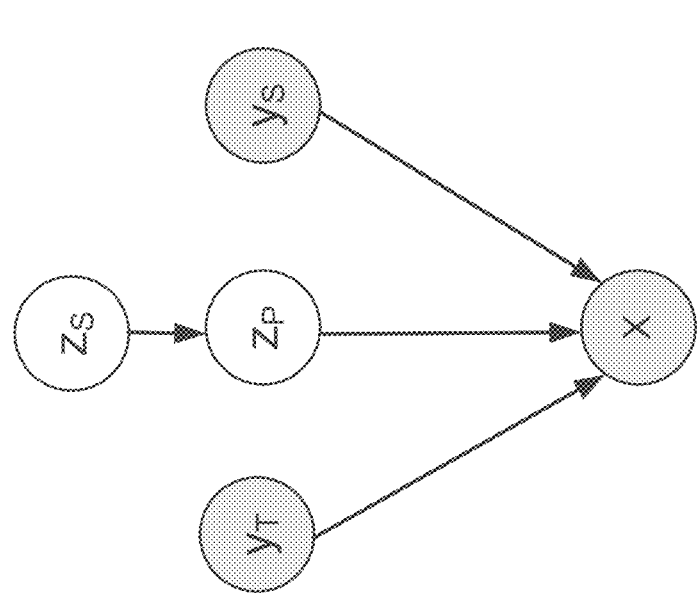
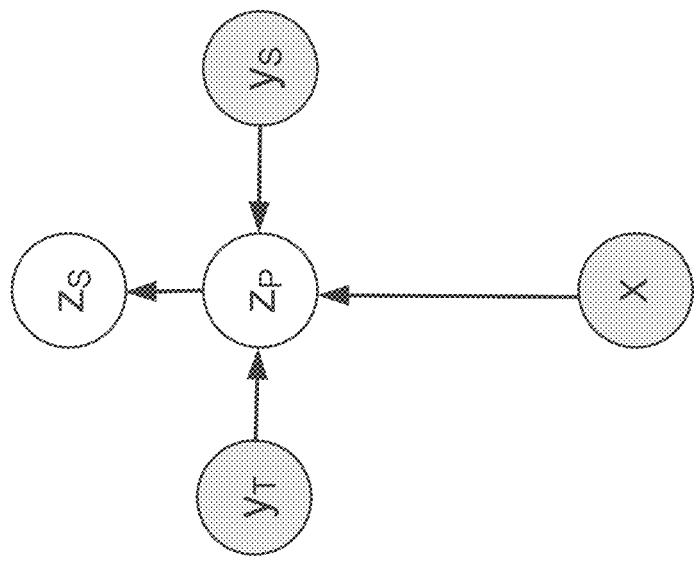
FIG. 9B
FIG. 9A

VARIATIONAL EMBEDDING CAPACITY IN EXPRESSIVE END-TO-END SPEECH SYNTHESIS

CROSS REFERENCE TO RELATED APPLICATIONS

This U.S. patent application claims priority under 35 U.S.C. § 119(e) to U.S. Provisional Application 62/851,879, filed on May 23, 2019. The disclosure of this prior application is considered part of the disclosure of this application and is hereby incorporated by reference in its entirety.

TECHNICAL FELD

This disclosure relates to effective use of variational embedding capacity in expressive end-to-end speech synthesis.

BACKGROUND

Neural networks are machine learning models that employ one or more layers of nonlinear units to predict an output for a received input. For instance, neural networks may convert input text to output speech. Some neural networks include one or more hidden layers in addition to an output layer. The output of each hidden layer is used as input to the next layer in the network, i.e., the next hidden layer or the output layer. Each layer of the network generates an output front a received input in accordance with current values of a respective set of parameters.

Some neural networks are recurrent neural networks. A recurrent neural network is a neural network that receives an input sequence and generates an output sequence from the input sequence in particular, a recurrent neural network can use some or all of the internal state of the network from a previous time step in computing an output at a current time step. An example of a recurrent neural network is a long short term (LSTM) neural network that includes one or more LSTM memory blocks. Each LSTM memory block can include one or more cells that each include an input gate, a forget gate and an output gate that allows the cell to store previous states for the cell. e.g., for use in generating a current activation or to be provided to other components of the LSTM neural network SUMMARY One aspect of the disclosure provides a method for estimating embedding capacity that includes receiving, at a deterministic reference encoder executing on data processing hardware, a reference audio signal and determining, by the data processing hardware, a reference embedding corresponding to the reference audio signal. The reference embedding has a corresponding embedding dimensionality. The method also includes measuring, by the data processing hardware, a first reconstruction loss as a function of the corresponding embedding dimensionality of the reference embedding, and obtaining, by the data processing hardware, a variational embedding from a variational posterior. The variational embedding has a corresponding embedding dimensionality and a specified capacity. The method also includes measuring, by the data processing hardware, a second reconstruction loss as a function of the corresponding embedding dimensionality of the variational embedding and estimating, by the data processing hardware, a capacity of the reference embedding by comparing the first measured reconstruction loss for the reference embedding relative to the second measured reconstruction loss for the variational embedding having the specified capacity.

Implementations of the disclosure may include one or more of the following optional features. In some implementations, the reference embedding includes a tan h non-linearity prosody embedding. The reference embedding may include a softmax non-linearity prosody embedding. The reference embedding may include a style embedding. In some examples, the estimated capacity of the reference embedding is substantially equal to the capacity of the variational embedding when the first and second measured reconstruction losses match one another.

In some examples, the specified capacity of the variational embedding is based on an adjustable variational bound of the variational posterior. In these examples, the adjustable variational bound may include an adjustable KL term that provides an upper bound on the variational embedding. Optionally, the adjustable variational bound may include a tunable KL weight that provides an upper bound on the variational embedding. Increasing the adjustable variational bound may increase the specified capacity of the variational embedding while decreasing the adjustable variational bound may decrease the specified capacity of the variational embedding.

Another aspect of the disclosure provides a system for estimating embedding capacity. The system includes data processing hardware and memory hardware in communication with the data processing hardware and storing instructions that when executed on the data processing hardware cause the data processing hardware to perform operations. The operations include receiving, at a deterministic reference encoder, a reference audio signal and determining a reference embedding corresponding to the reference audio signal. The reference embedding has a corresponding embedding dimensionality. The operations also include measuring a first reconstruction loss as a function of the corresponding embedding dimensionality of the reference embedding, and obtaining a variational embedding from a variational posterior. The variational embedding has a corresponding embedding dimensionality and a specified capacity. The operations also include measuring a second reconstruction loss as a function of the corresponding embedding dimensionality of the variational embedding and estimating a capacity of the reference embedding by comparing the first measured reconstruction loss for the reference embedding relative to the second measured reconstruction loss for the variational embedding having the specified capacity This aspect may include one or more of the following optional features. In some implementations, the reference embedding includes a tan h non-linearity prosody embedding. The reference embedding may include a softmax non-linearity prosody embedding. The reference embedding may include a style embedding. In some examples, the estimated capacity of the reference embedding is substantially equal to the capacity of the variational embedding when the first and second measured reconstruction losses match one another.

In some examples, the specified capacity of the variational embedding is based on an adjustable variational bound of the variational posterior. In these examples, the adjustable variational bound may include an adjustable KL term that provides an upper bound on the variational embedding. Optionally, the adjustable variational bound may include a tunable KL weight that provides an upper bound on the variational embedding. Increasing the adjustable variational bound may increase the specified capacity of the variational embedding while decreasing the adjustable variational bound may decrease the specified capacity of the variational embedding.

The details of one or more implementations of the disclosure are set forth in the accompanying drawings and the description below. Other aspects, features, and advantages will be apparent from the description and drawings, and from the claims.

DESCRIPTION OF DRAWINGS

FIGS. 8A-8C show true and variational posteriors using conditional dependencies as inputs.

FIGS. 9A and 9B show true and variational posteriors using conditional dependencies as inputs and allowing fractions of variation present in variational embeddings to be specified to enable sampling of remaining variations.

Like reference symbols in the various drawings indicate like elements,

DETAILED DESCRIPTION

The synthesis of realistic human speech is an underdetermined problem in that a same text input has an infinite number of reasonable spoken realizations. While End-to-end neural network-based approaches are advancing to match human performance for short assistant-like utterances, neural network models are sometimes viewed as less interpretable or controllable than more conventional models that include multiple processing steps each operating on refined linguistic or phonetic representations. Accordingly, implementations herein are directed toward producing end-to-end models that can probabilistically model and/or directly control remaining variability in synthesized speech.

Sources of variability include prosodic characteristics of intonation, stress, rhythm, and style, as well as speaker and channel characteristics. The prosodic characteristics of a spoken utterance convey linguistic, semantic, and emotional meaning beyond what is present in a lexical representation (e.g., a transcript of the spoken utterance). Providing an ability to transfer these characteristics from one utterance to another enables users to control how synthesized speech sounds by using their own voice (e.g., "say it like this"), rather than having to manipulate complicated acoustic or linguistic parameters by hand. Implementations herein are further directed toward methods that enable sampling from a distribution over likely prosodic realizations of an utterance in order to allow users to experience the variety present in natural speech. Implementations herein may include.

Figure 1:
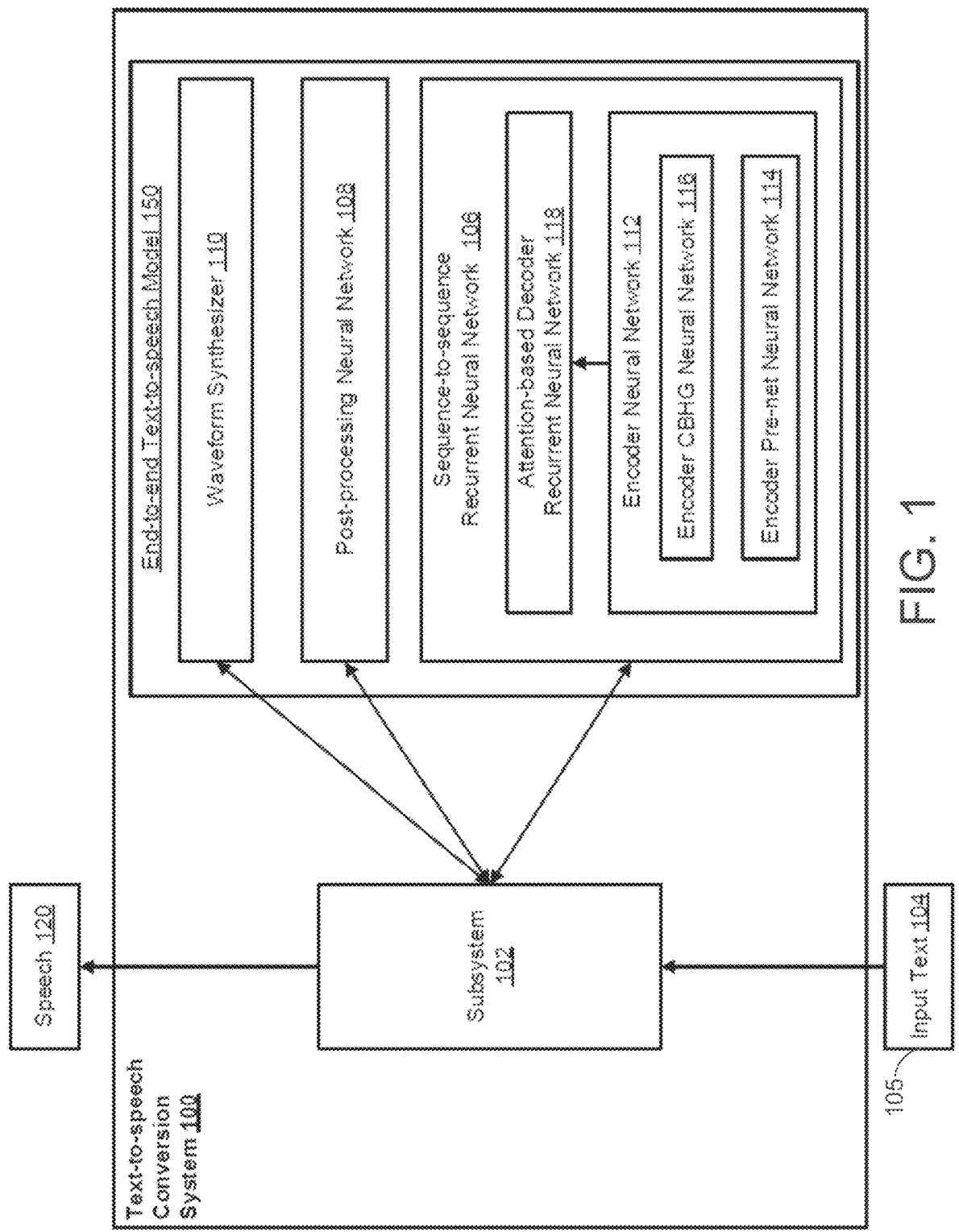
FIG. 1 is a schematic view of an example text-to-speech conversion system.

Referring to FIG. 1, in some implementations, an example text-to-speech (TTS) conversion system 100 includes a subsystem 102 that is configured to receive input text 104 as an input and to process the input text 104 to generate speech 120 as an output. The input text 104 includes a sequence of characters in a particular natural language. The sequence of characters may include alphabet letters, numbers, punctuation marks, and/or other special characters. The input text 104 can be a sequence of characters of varying lengths. The text-to-speech conversion system 100 is an example of a system implemented as computer programs on one or more computers in one or more locations, in which the systems, components, and techniques described below can be implemented. For instance, the system 100 may execute on the computer system 1300 of FIG. 13.

The system 100 may include a user interface 105 that allows users to input text 104 for conversion into synthesized speech and/or provide reference speech 412 (FIG. 4) using their own voice so that a variational embedding associated with the reference speech can control how speech synthesized from input text sounds. The user interface 105 may also allow a user to select a target speaker that is different than a voice of the user providing the reference speech 412 so that the synthesized speech sounds like the target speaker, but having the prosody/style conveyed in the reference speech uttered by the user. The user interface 105 may further permit the user to select/sample from a distribution over likely prosodic realizations of an utterance in order to allow users to experience the variety present in natural speech.

To process the input text 104, the subsystem 102 is configured to interact with an end-to-end text-to-speech model 150 that includes a sequence-to-sequence recurrent neural network 106 (hereafter "seq2seq network 106"), a post-processing neural network 108, and a waveform synthesizer 110.

After the subsystem 102 receives input text 104 that includes a sequence of characters in a particular natural language, the subsystem 102 provides the sequence of characters as input to the seq2seq network 106. The seq2seq network 106 is configured to receive the sequence of characters from the subsystem 102 and to process the sequence of characters to generate a spectrogram of a verbal utterance of the sequence of characters in the particular natural language.

In particular, the seq2seq network 106 processes the sequence of characters using (i) an encoder neural network 112, which includes an encoder pre-net neural network 114 and an encoder CBHG neural network 116, and (ii) an attention-based decoder recurrent neural network 118. Each character in the sequence of characters can be represented as a one-hot vector and embedded into a continuous vector. That is, the subsystem 102 can represent each character in the sequence as a one-hot vector and then generate an embedding, i.e., a vector or other ordered collection of numeric values, of the character before providing the sequence as input to the seq2seq network 106.

The encoder pre-net neural network 114 is configured to receive a respective embedding of each character in the sequence and process the respective embedding of each character to generate a transformed embedding of the character. For example, the encoder pre-net neural network 114 can apply a set of non-linear transformations to each embedding to generate a transformed embedding. In some cases, the encoder pre-net neural network 114 includes a bottleneck neural network layer with dropout to increase convergence speed and improve generalization capability of the system during training.

The encoder CBHG neural network 116 is configured to receive the transformed embeddings from the encoder pre-net neural network 206 and process the transformed embeddings to generate encoded representations of the sequence of characters. The encoder CBHG neural network 112 includes a CBHG neural network 200 (FIG. 2), which is described in more detail below with respect to FIG. 2. The use of the encoder CBHG neural network 112 as described herein may reduce overfitting. In addition, the encoder CBHB neural network 112 may result in fewer mispronunciations when compared to, for instance, a multi-layer RNN encoder.

The attention-based decoder recurrent neural network 118 (herein referred to as "the decoder neural network 118") is configured to receive a sequence of decoder inputs. For each decoder input in the sequence, the decoder neural network 118 is configured to process the decoder input and the encoded representations generated by the encoder CBHG neural network 116 to generate multiple frames of the spectrogram of the sequence of characters. That is, instead of generating (predicting) one frame at each decoder step, the decoder neural network 118 generates r frames of the spectrogram, with r being an integer greater than one in many cases, there is no overlap between sets of r frames.

In particular, at decoder step t, at least the last frame of the r frames generated at decoder step t−1 is fed as input to the decoder neural network 118 at decoder step t+1 In some implementations, all of the r frames generated at the decoder step t−1 are fed as input to the decoder neural network 118 at the decoder step t+1. The decoder input for the first decoder step can be an all-zero frame (i.e. a <GO> frame). Attention over the encoded representations is applied to all decoder steps, e.g., using a conventional attention mechanism. The decoder neural network 118 may use a fully connected neural network layer with a linear activation to simultaneously predict r frames at a given decoder step. For example, to predict 5 frames, each frame being an 80-D (80-Dimension) vector, the decoder neural network 118 uses the fully connected neural network layer with the linear activation to predict a 400-D vector and to reshape the 400-D vector to obtain the 5 frames.

By generating r frames at each time step, the decoder neural network 118 divides the total number of decoder steps by r, thus reducing model size, training time, and inference time. Additionally, this technique substantially increases convergence speed, i.e., because it results in a much faster (and more stable) alignment between frames and encoded representations as learned by the attention mechanism. This is because neighboring speech frames are correlated and each character usually corresponds to multiple frames. Emitting multiple frames at a time step allows the decoder neural network 118 to leverage this quality to quickly learn how to, i.e., be trained to, efficiently attend to the encoded representations during training.

The decoder neural network 118 may include one or more gated recurrent unit neural network layers. To speed up convergence, the decoder neural network 118 may include one or more vertical residual connections. In some implementations, the spectrogram is a compressed spectrogram such as a mel-scale spectrogram. Using a compressed spectrogram instead of, for instance, a raw spectrogram may reduce redundancy, thereby reducing the computation required during training and inference.

Figure 2:
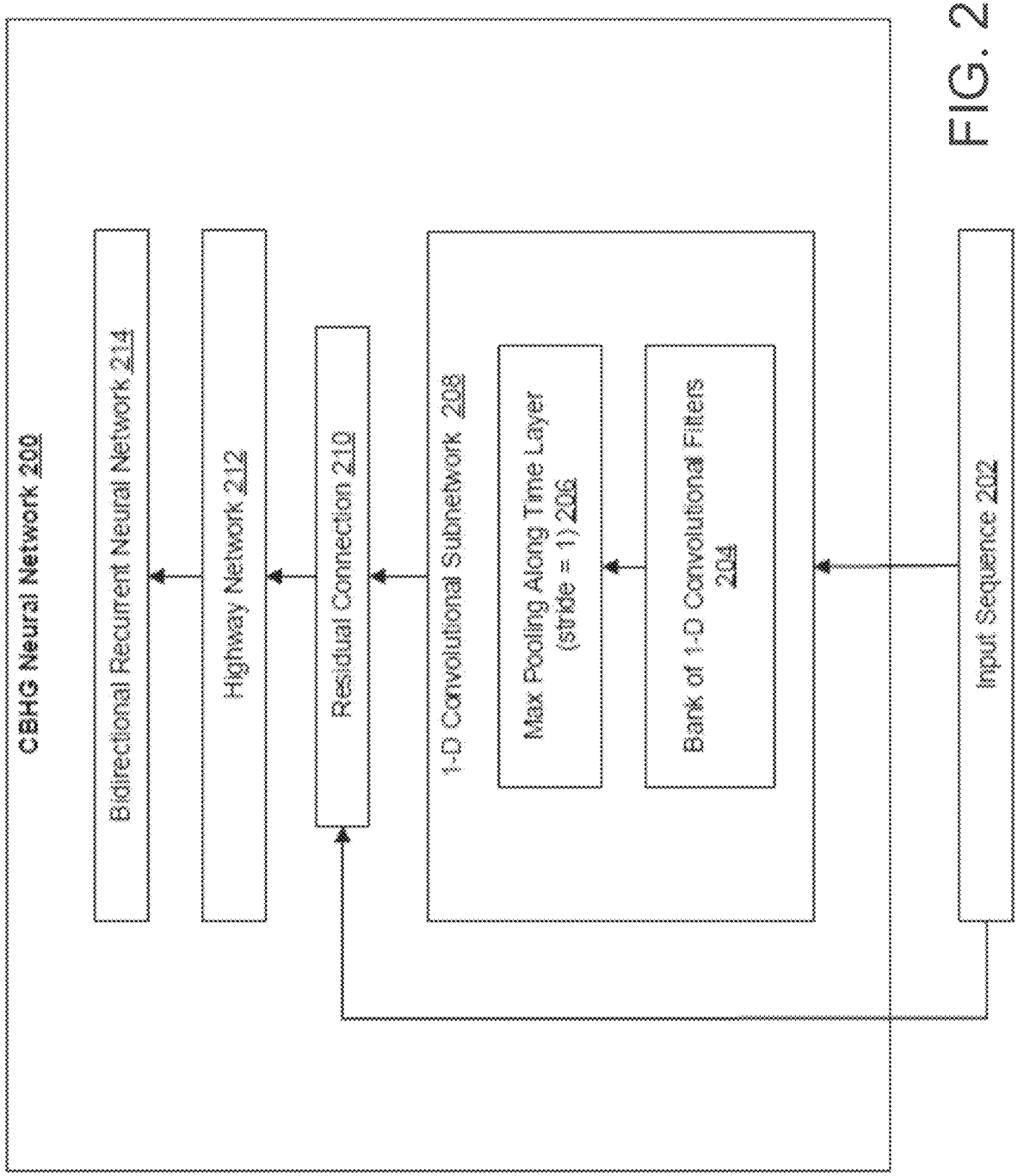
FIG. 2 is a schematic view of an example CBHG neural network.

The post-processing neural network 108 is configured to receive the compressed spectrogram and process the compressed spectrogram to generate a waveform synthesizer input. To process the compressed spectrogram, the post-processing neural network 108 includes the CBHG neural network 200 (FIG. 2). In particular, the CBHG neural network 200 includes a 1-D convolutional subnetwork, followed by a highway network, and followed by a bidirectional recurrent neural network. The CBHG neural network 200 may include one or more residual connections. The 1-D) convolutional subnetwork may include a bank of 1-D convolutional filters followed by a max pooling along time layer with stride one. In some cases, the bidirectional recurrent neural network is a gated recurrent unit neural network. The CBHG neural network 200 is described in more detail below with reference to FIG. 2.

In some implementations, the post-processing neural network 108 and the sequence-to-sequence recurrent neural network 106 are trained jointly. That is, during training, the system 100 (or an external system) trains the post-processing neural network 108 and the seq2seq network 106 on the same training dataset using the same neural network training technique, e.g., a gradient descent-based training technique. More specifically, the system 100 (or an external system) can backpropagate an estimate of a gradient of a loss function to jointly adjust the current values of all network parameters of the post-processing neural network 108 and the seq2seq network 106. Unlike conventional systems that have components that need to be separately trained or pre-trained and thus each component's errors can compound, systems that have the post-processing neural network 108 and seq2seq network 106 that are jointly trained are more robust (e.g., they have smaller errors and can be trained from scratch). These advantages enable the training of the end-to-end text-to-speech model 150 on a very large amount of rich, expressive yet often noisy data found in the real world.

The waveform synthesizer 110 is configured to receive the waveform synthesizer input, and process the waveform synthesizer input to generate a waveform of the verbal utterance of the input sequence of characters in the particular natural language. In some implementations, the waveform synthesizer is a Griffin-Lim synthesizer. In some other implementations, the waveform synthesizer is a vocoder. In some other implementations, the waveform synthesizer is a trainable spectrogram to waveform inverter. After the waveform synthesizer 110 generates the waveform, the subsystem 102 can generate speech 120 using the waveform and provide the generated speech 120 for playback, e.g., on a user device, or provide the generated waveform to another system to allow the other system to generate and play back the speech. In some examples, a WaveNet neural vocoder replaces the waveform synthesizer 110. A WaveNet neural vocoder may provide different audio fidelity of synthesized speech in comparison to synthesized speech produced by the waveform synthesizer 110.

FIG. 2 shows an example CBHG neural network 200. The CBHG neural network 200 can be the CBHG neural network included in the encoder CBHG neural network 116 or the CBHG neural network included in the post-processing neural network 108 of FIG. 1. The CBHG neural network 200 includes a 1-D convolutional subnetwork 208, followed by a highway network 212, and followed by a bidirectional recurrent neural network 214. The CBHG neural network 200 may include one or more residual connections, e.g., the residual connection 210.

The 1-D convolutional subnetwork 208 may include a bank of 1-D convolutional filters 204 followed by a max pooling along time layer with a stride of one 206. The bank of 1-D convolutional filters 204 may include K sets of 1-D convolutional filters, in which the k-th set includes $C_k$ filters each having a convolution width of A. The 1-D convolutional subnetwork 208 is configured to receive an input sequence 202, for example, transformed embeddings of a sequence of characters that are generated by an encoder pre-net neural network 114 (FIG. 1). The subnetwork 208 processes the input sequence 202 using the bank of 1-D convolutional filters 204 to generate convolution outputs of the input sequence 202. The subnetwork 208 then stacks the convolution outputs together and processes the stacked convolution outputs using the max pooling along time layer with stride one 206 to generate max-pooled outputs. The subnetwork 208 then processes the max-pooled outputs using one or more fixed-width 1-D convolutional filters to generate subnetwork outputs of the subnetwork 208.

After the 1-D convolutional subnetwork 208 generates the subnetwork outputs, the residual connection 210 is configured to combine the subnetwork outputs with the original input sequence 202 to generate convolution outputs. The highway network 212 and the bidirectional recurrent neural network 214 are then configured to process the convolution outputs to generate encoded representations of the sequence of characters. In particular, the highway network 212 is configured to process the convolution outputs to generate high-level feature representations of the sequence of characters. In some implementations, the highway network includes one or more fully-connected neural network layers.

The bidirectional recurrent neural network 214 is configured to process the high-level feature representations to generate sequential feature representations of the sequence of characters. A sequential feature representation represents a local stricture of the sequence of characters around a particular character. A sequential feature representation may include a sequence of feature vectors. In some implementations, the bidirectional recurrent neural network is a gated recurrent unit neural network.

During training, one or more of the convolutional filters of the 1-D convolutional subnetwork 208 can be trained using batch normalization method, which is described in detail in S. Ioffe and C. Szegedy, "Batch normalization: Accelerating deep network training by reducing internal covariate shift," arXiv preprint arXiv-1502.03167, 2015. In some implementations, one or more convolutional filters in the CBHG neural network 200 are non-causal convolutional filters, i.e., convolutional filters that, at a given time step T, can convolve with surrounding inputs in both directions (e.g., T−1, T−2 and T+1, T+2, . . . etc.). In contrast, a causal convolutional filter can only convolve with previous inputs ( . . . T−1, T−2, etc.). In some other implementations, all convolutional filters in the CBHG neural network 200 are non-causal convolutional filters. The use of non-causal convolutional filters, batch normalization, residual connections, and max pooling along time layer with stride one improves the generalization capability of the CBHG neural network 200 on the input sequence and thus enables the text-to-speech conversion system to generate high-quality speech.

Figure 3:
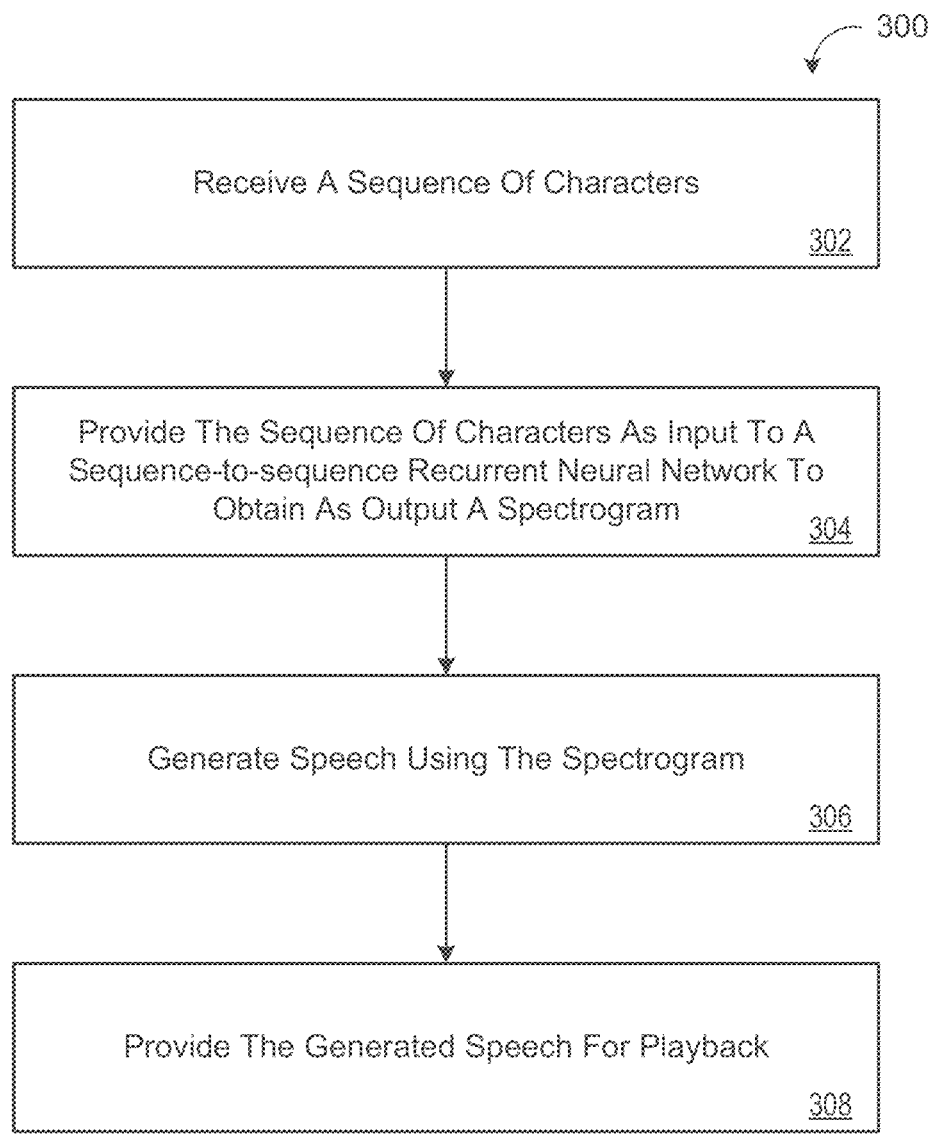
FIG. 3 is an example arrangement of operations for synthesizing speech from input text.

FIG. 3 is an example arrangement of operations for a method 300 of generating speech from a sequence of characters. For convenience, the process 300 will be described as being performed by a system of one or more computers located in one or more locations. For example, a text-to-speech conversion system (e.g., the text-to-speech conversion system 100 of FIG. 1) or a subsystem of a text-to-speech conversion system (e.g. the subsystem 102 of FIG. 1), appropriately programmed, can perform the process 300.

At operation 302, the method 300 includes the system receiving a sequence of characters in a particular natural language, and at operation 304, the method 300 includes the system providing the sequence of characters as input to a sequence-to-sequence (seq2seq) recurrent neural network 106 to obtain as output a spectrogram of a verbal utterance of the sequence of characters in the particular natural language. In some implementations, the spectrogram is a compressed spectrogram, e.g., a mel-scale spectrogram. In particular, the seq2seq recurrent neural network 106 processes the sequence of characters to generate a respective encoded representation of each of the characters in the sequence using an encoder neural network 112 that includes an encoder pre-net neural network 114 and an encoder CBHG neural network 116.

More specifically, each character in the sequence of characters can be represented as a one-hot vector and embedded into a continuous vector. The encoder pre-net neural network 114 receives a respective embedding of each character in the sequence and processes the respective embedding of each character in the sequence to generate a transformed embedding of the character. For example, the encoder pre-net neural network 114 can apply a set of non-linear transformations to each embedding to generate a transformed embedding. The encoder CBHG neural network 116 then receives the transformed embeddings from the encoder pre-net neural network 114 and processes the transformed embeddings to generate the encoded representations of the sequence of characters.

To generate a spectrogram of a verbal utterance of the sequence of characters, the seq2seq recurrent neural network 106 processes the encoded representations using an attention-based decoder recurrent neural network 118. In particular, the attention-based decoder recurrent neural network 118 receives a sequence of decoder inputs. The first decoder input in the sequence is a predetermined initial frame. For each decoder input in the sequence, the attention-based decoder recurrent neural network 118 processes the decoder input and the encoded representations to generate r frames of the spectrogram, in which r is an integer greater than one. One or more of the generated r frames can be used as the next decoder input in the sequence. In other words, each other decoder input in the sequence is one or more of the r frames generated by processing a decoder input that precedes the decoder input in the sequence.

The output of the attention-based decoder recurrent neural network thus includes multiple sets of frames that form the spectrogram, in which each set includes r frames. In many cases, there is no overlap between sets of r frames. By generating r frames at a time, the total number of decoder steps performed by the attention-based decoder recurrent neural network is reduced by a factor of r, thus reducing training and inference time. This technique also helps to increase convergence speed and learning rate of the attention-based decoder recurrent neural network and the system in general.

At operation 306, the method 300 includes generating speech using the spectrogram of the verbal utterance of the sequence of characters in the particular natural language. In some implementations, when the spectrogram is a compressed spectrogram, the system can generate a waveform from the compressed spectrogram and generate speech using the waveform.

At operation 308, the method 300 includes providing the generated speech for playback. For example, the method 300 may provide the generated speech for playback by transmitting the generated speech from the system to a user device (e.g., audio speaker) over a network for playback.

Implementations herein are directed toward introducing a number extensions to latent variable models based on the ITS conversions system 100 for expressive speech synthesis (e.g., control and transfer of prosody and style) that allow the models to make more effective use of latent/variational embeddings. The use of latent variable models enables probabilistically modeling and/or directly controlling remaining variability in synthesized speech. Sources of variability include prosodic characteristics of intonation, stress, rhythm, and style, as well as speaker and channel characteristics. The prosodic characteristics of a spoken utterance convey linguistic, semantic, and emotional meaning beyond what is present in a lexical representation (e.g., a transcript of the spoken utterance). Providing an ability to transfer these characteristics from one utterance to another enables users to control how synthesized speech sounds by using their own voice (e.g., "say it like this"), rather than having to manipulate complicated acoustic or linguistic parameters by hand. In some implementations, methods include varying a capacity target of a reconstruction loss term in a variational reference encoder to allow transferring a prosody of reference speech at a fine-grained level (e.g., prioritizing precision) to a similar piece of text (i.e., text having a similar number of syllables as the reference speech), or at a coarse-grained level (e.g., prioritizing generalization) to an arbitrary piece of text (i.e., text of any length and syllabic content).

Figure 4:
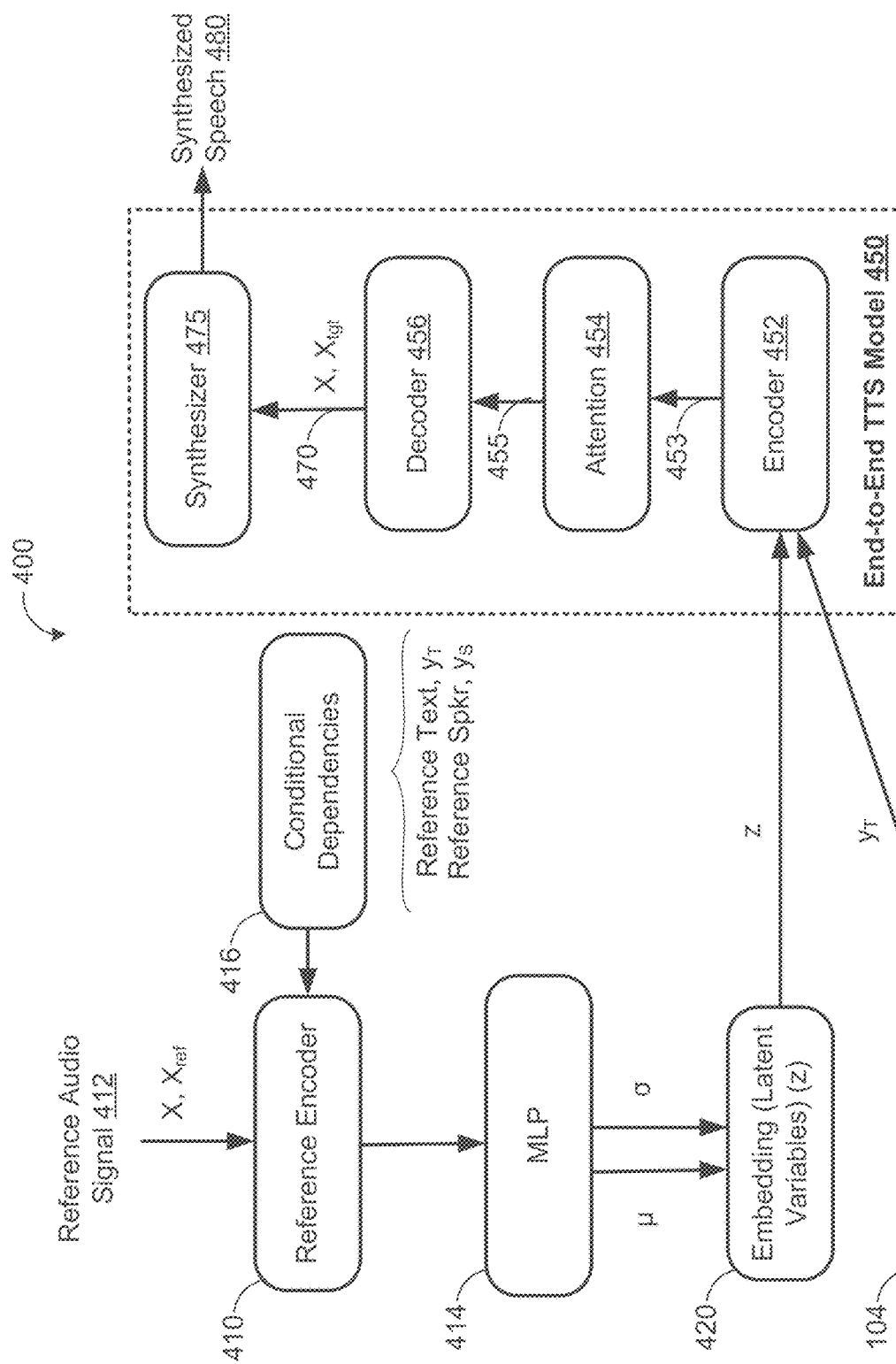
FIG. 4 is a schematic view of an example variational autoencoder for controlling and transferring prosody and style.

FIG. 4 shows an example prosody-style transfer model 400 for transferring style and/or prosody of a reference speaker to a target speaker and/or controlling style and/or prosody of synthesized speech 480 produced from input text. The transfer model 400 allows users to synthesize natural speech with a particular speaking style or prosody in a variety of different but natural ways. As will become apparent, the transfer model 400 enables transferring of prosodic/style characteristics from one utterance to another by using a reference utterance (e.g., "say it like this"). Additionally, the transfer model 400 permits randomly sampling prosodic characteristics from a distribution over likely prosodic realizations of an utterance in order to provide natural variety across longer sections of speech.

The transfer model 400 includes a variational autoencoder (VAE) network for unsupervised learning of latent representations (i.e., variational embeddings (z)) of speaking styles. Learning variational embeddings through the use of the VAE provides favorable properties of disentangling, scaling, and combination for simplifying style control compared to heuristic-based systems. The transfer system 400 includes a reference encoder 410 and an end-to-end TTS model 450 configured to receive a reference audio signal (X, $X_{ref}$) 412 as input and determine a variational embedding (z) 420 for the reference audio signal 412 as output. The TTS model 450 receives the variational embedding 420 output from the reference encoder 420 for converting input text 104 into synthesized speech 480 (e.g., output audio signal 470 (X, $X_{tgt}$)) having a style/prosody specified by the variational embedding 420. That is to say, the variational embedding 420 enables the synthesized speech 480 produced by the TTS model 450 to sound like the reference audio signal 412 input to the reference encoder 412.

The TTS model 450 includes an encoder 452, an attention module 454, a decoder 456, and a synthesizer 475. In some implementations, the TUTS model 450 includes the TTS model 100 of FIG. 1. For instance, the encoder 452, the attention module 454, and the decoder 456 may collectively correspond to the seq2seq recurrent neural network 106 and the synthesizer 475 may include the waveform synthesizer 110 or a WaveNet neural vocoder. However, the choice of synthesizer 475 has no impact on resulting prosody and/or style of the synthesized speech, and in practice, only impacts audio fidelity of the synthesized speech 480. The attention module 454 may include Gaussian Mixture Model (GMM) attention to improve generalization to long utterances. Accordingly, the encoder 452 of the TTS model 450 may use a CBHG neural network 200 (FIG. 2) to encode the input text 104 and modify the GMM attention of the attention model 454 to compute the parameters using a sotlplus function instead of exp.

The input text 104 may include phoneme inputs produced by a text normalization front-end and lexicon since prosody is being addressed, rather than the model's ability to learn pronunciation from graphemes. The decoder 456 may include the decoder recurrent neural network 118 (FIG. 1) and use a reduction factor equal to two (2), thereby producing two spectrogram frames (e.g., output audio signal 470) per timestep. In some examples, two layers of 256-cell long short term memory (LSTM) using zoneout with probability equal to 0.1 may replace GRU cells of the decoder 456. In other implementations, the TTS model 450 includes the speech synthesis system disclosed in U.S. application Ser. No. 16/058,640, filed on Aug. 8, 2018, the contents of which are incorporated by reference in their entirety.

The variational embedding 420 corresponds to a latent state of a target speaker, such as affect and intent, which contributes to the prosody, emotion, and/or speaking style of the target speaker. As used herein, the variational embedding 420 includes both style information and prosody information. In some examples, the variational embedding 420 includes a vector of numbers having a capacity represented by a number of bits in the variational embedding 420. Generally, increasing a capacity of the variational embedding 420 increases precision of the synthesized speech 480 such that the target speaker represented by the synthesized speech 480 closely resembles the reference audio signal 412. As such, high capacity variational embeddings 420 prioritize precision and are better suited for inter-speaker transfer scenarios. However, one-drawback with achieving these increases in precision is that the input text 104 (i.e., target text) converted by the TTS model 450 must closely resemble reference text corresponding to the reference audio signal 412, whereby the reference text is input to the TTS model 450 during training of the transfer system 400. As used herein, input text 104 closely resembles reference text when the input text 104 includes a similar number of vowels as the reference text. On the other hand, decreasing a capacity of the variational embedding 420 increases generality of the variational embedding 420 such that the variational embedding 420 works well for producing synthesized speech 480 from different input texts 104 (i.e., inter-text transfer). Accordingly, low capacity variational embeddings 420 prioritize generality and are better suited for text-agnostic style transfer. 100601 in some implementations, the reference encoder 410 also receives conditional dependencies 416 to balance the tradeoff between precision and generality such that both style and prosody are controllable and transferable. By contrast to heuristic-based encoders 410 that are only capable of computing prosody/style embeddings from reference audio, the reference encoder 410 in the VAE permits sampling of variational embeddings 420 previously produced by the encoder 410 so that a greater variety of prosodic and style information is capable of representing the input text 104 input to the TTS model 450 for conversion to synthesized speech 480. As such, a reference audio signal 412 is not needed for computing the variational embedding 420 because the variational embedding 420 can be sampled. Of course, the reference encoder 110 can compute variational embeddings 420 from a reference audio signal 412 (e.g., "say it like this"). As described in greater detail below, hierarchical fractions containing different style/prosody information can be decomposed from the variational embedding 420, enabling later sampling of these hierarchical fractions of the variational embedding 420 in order to control a trade-off between reference similarity and sample variability in inter-speech transfer scenarios. The conditional dependencies 416 include reference/target text $y_T$ characterizing the reference audio signal 412 and/or a reference/target speaker $y_S$ indicating an identity of the speaker that uttered the reference audio signal 412. The reference/target speaker $y_S$ allows an identity of a target speaker (or reference speaker) to be preserved during inter-speaker transfer. For instance, when a reference speaker has a different pitch range than the target speaker, the synthesized speech 450 may still sound like the target speaker since a suitable variational embedding 420 can be sampled by the reference encoder 410 when the reference speaker $y_S$ is provided.

The input text 104 and the reference text $t_T$ of the conditional dependences 416 may include character sequences while the reference and output audio signals 412, 470 correspond to acoustic features that may include mel-frequency spectrograms. The reference encoder 410 includes a neural network.

Figure 5:
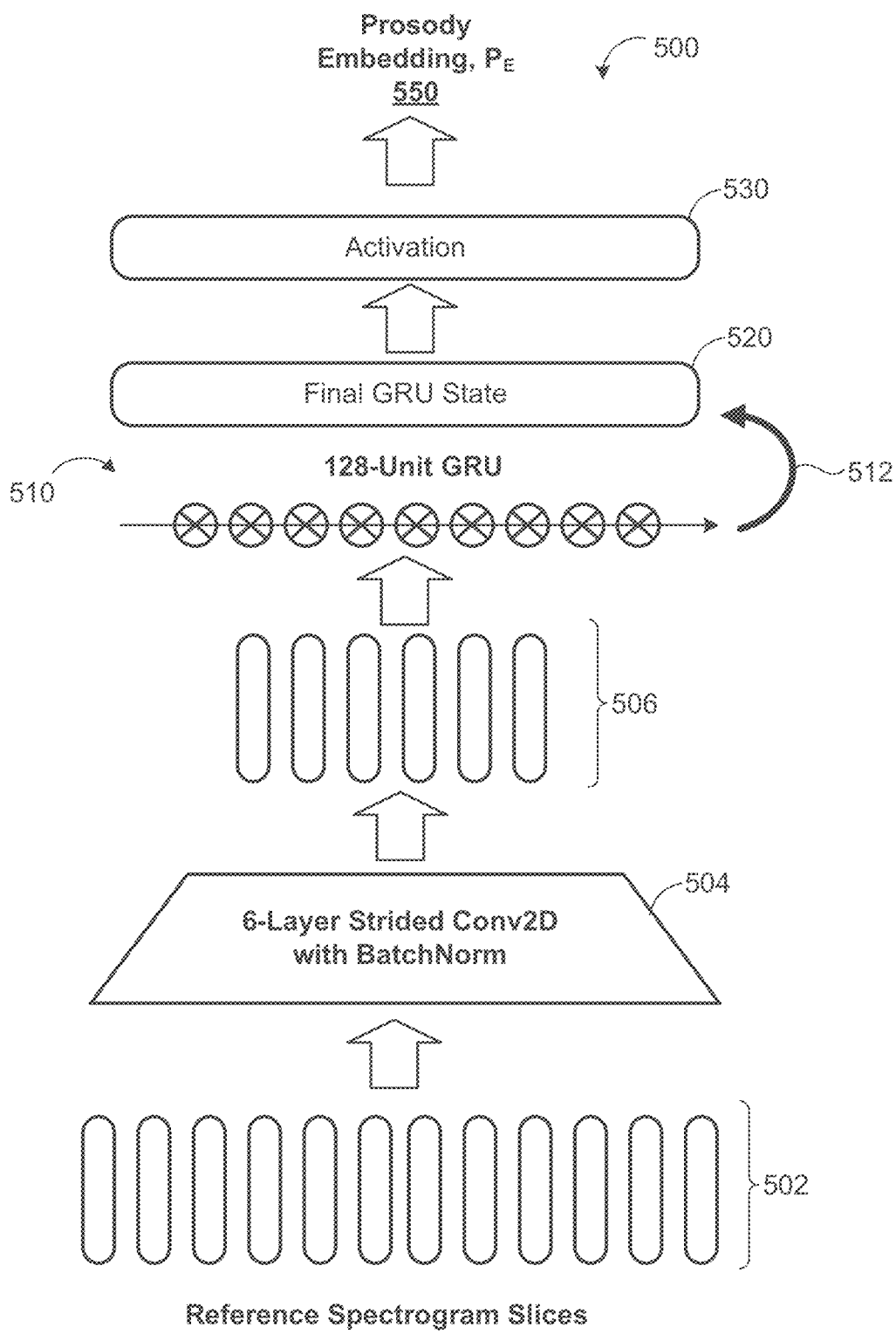
FIG. 5 is a schematic view of an example deterministic reference encoder for transferring prosody.

Referring to FIG. 5, in some implementations, the reference encoder 410 modifies a deterministic reference encoder 500 disclosed by "Towards End-to-End Prosody Transfer for Expressive Speech Synthesis with Tacotron", arXiv preprint arXiv:1803.09047, Mar. 24, 2018, the contents of which are incorporated by reference in their entirety. In some implementations, the reference encoder 500 is configured to receive a reference audio signal 502 and generate/predict a fixed-length prosody embedding $P_E$ 550 (also referred to as "prosodic embedding") from the reference audio signal 502. The prosody embedding $P_E$ 550 may capture characteristics of the reference audio signal 502 independent of phonetic information and idiosyncratic speaker traits such as, stress, intonation, and timing. The prosody embedding P 550 may used as an input for preforming prosody transfer in which synthesized speech is generated for a completely different speaker than the reference speaker, but exhibiting the prosody of the reference speaker.

In the example shown, the reference audio signal 502 may be represented as spectrogram slices having a length La and dimension Da. The spectrogram slices associated with the reference audio signal 502 may be indicative of a Mel-warped spectrum. In the example shown, the reference encoder 500 includes a six-layer convolutional layer network 504 with each layer including 3×3 filters with 2×2 stride, SAME padding, and ReLU activation. Batch normalization is applied to every layer and the number of filters in each layer doubles at half the rate of downsampling: 32, 32, 64, 128, 128. A recurrent neural network 510 with a single 128-width Gated Recurrent Unit (GRU-RNN) layer receives the output 506 from the last convolutional layer and outputs a 128-dimensional output 512 applied to a fully connected layer 520 followed by an activation function 530 that outputs the predicted prosody embedding $P_E$ 550. The recurrent neural network 510 may include other types of bidirectional recurrent neural networks.

The choice of activation function 530 (e.g., a softmax or tan h) in reference encoder 500 may constrain the information contained in the style embedding $S_E$ 550 and help facilitate learning by controlling the magnitude of the predicted prosody embedding $P_E$ 550. Moreover, the choice of the length $L_P$ and the dimension DR of the reference audio signal 502 input to the reference encoder 500 impacts different aspects of prosody learned by the encoder 500. For instance, a pitch track representation may not permit modeling of prominence in some language since the encoder does not contain energy information, while a Mel Frequency Cepstral Coefficient (MFCC) representation may, at least to some degree depending on the number of coefficients trained, prevent the encoder 400 from modeling intonation.

While the prosody embedding $P_E$ 550 output from the reference encoder 500 can be used in a multitude of different TTS architectures for producing synthesized speech, a seed signal (e.g., reference audio signal 502) is required for producing the prosody embedding $P_E$ 550 at inference time. For instance, the seed signal could be a "Say it like this" reference audio signal 502. Alternatively, to convey synthesized speech with an intended prosody/style, some TTS architectures can be adapted to use a manual style embedding selection at inference time instead of using the reference encoder 500 to output a prosody embedding $P_E$ 550 from a seed signal.

The reference encoder 500 of FIG. 5 corresponds to a heuristic-based model (non-variational) for predicting fixed-length prosodic embeddings, and includes a six-layer convolutional layer network with each layer including 3×3 filters with 2×2 stride, SAME padding, and ReLU activation. Batch normalization is applied to every layer and the number of filters in each layer doubles at half the rate of downsampling. 32, 32, 64, 128, 128. A recurrent neural network with single 128-width Gated Recurrent U nit (GRU) layer receives the output from the last convolutional layer and outputs a 128-dimensional output applied to a fully connected layer followed by a softmax, tan h activation function. Referring back to FIG. 4, the reference encoder 410 corresponds to a 'variational posterior' that replaces the tan h bottleneck layer of the deterministic reference encoder 500 of FIG. 5 with multilayer perception (MLP) 414 having linear activation to predict the parameters (i.e., mean μ and standard deviation a of latent variables) of the reference encoder 410. When used, the conditional dependencies 416 (reference text $y_T$ and/or reference speaker $y_S$) may feed into the MLP 414 as well. The variability embedding (z) 420 may be derived using reparameterization based on the mean p and standard deviation a of the latent variables output from the MLP 414 of the reference encoder 410. The encoder states input to the text encoder 452 of the TTS model 450 include the variability embedding (z) 420 and the sequence of characters in the input text 104, such that an encoded sequence 453 output from the encoder 452 includes a summation of the input text 104 and the variability embedding 420 which is consumed by the attention module 454. The text encoder 452 may also receive a target speaker yS identifying a specific speaker for how the synthesized speech 480 should sound. In some examples, the attention module 454 is configured to convert the encoded sequence 453 to a fixed-length context vector 455 for each output step of the decoder 456 to produce the output audio signal 470.

During training, a transcript of the reference audio signal 412 matches the sequence of characters of the input text sequence 104 input to the encoder 452 of the TTS model 450 so that the output audio signal 470 output from the decoder 456 will match the reference audio signal 412. During inference, the transfer system 400 may perform inter-text transfer by including different input text sequences 104 to the encoder 452 that do not match the transcript of the reference audio signal 412. Similarly, the transfer system 400 may perform inter-speaker transfer by specifying speakers for the synthesized speech that are different than the speaker uttering the reference audio signal.

Figure 6:
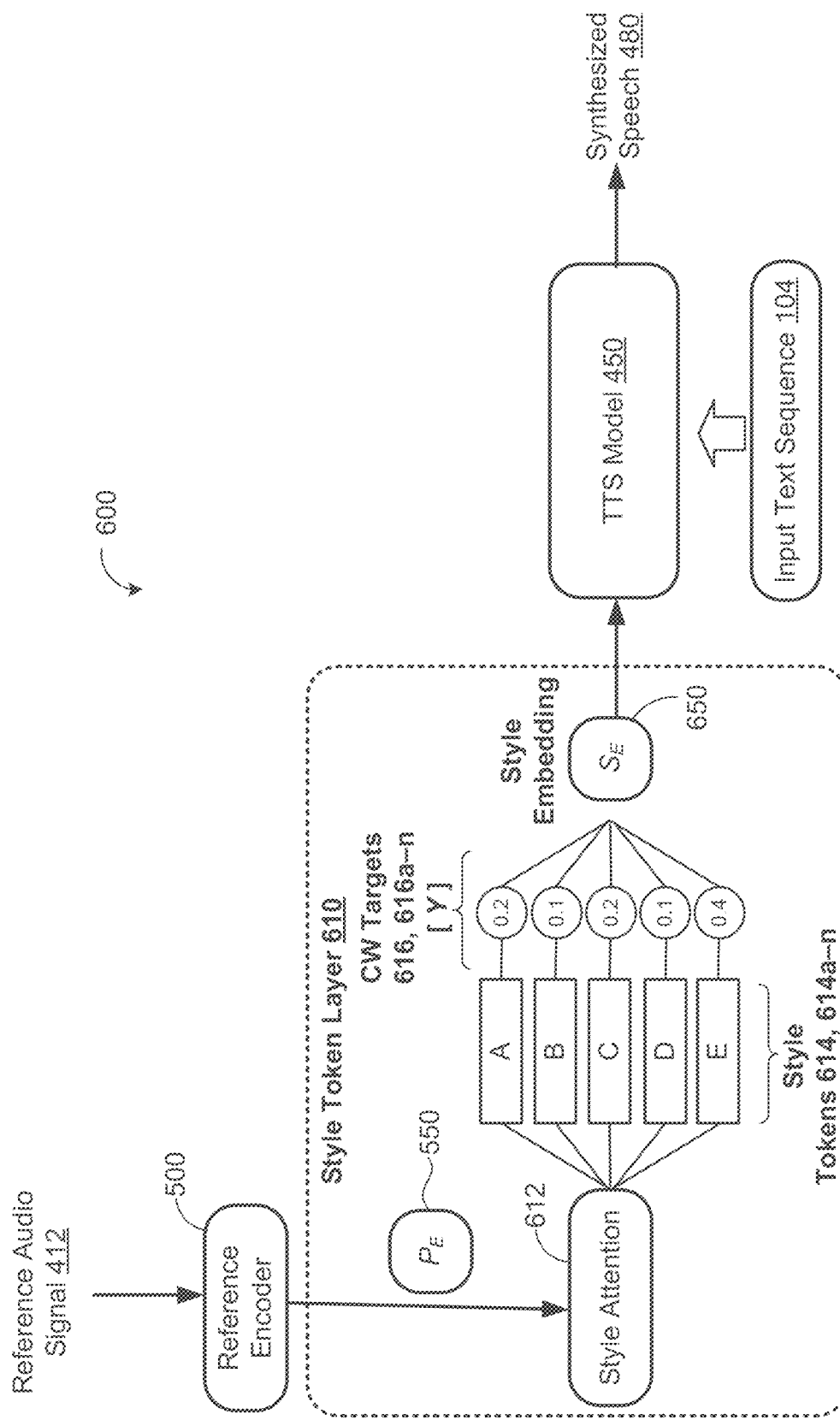
FIG. 6 is a schematic view of an example heuristic-based model including a deterministic reference encoder and a style layer for transferring style.

While FIG. 5 shows the deterministic reference encoder 500 for computing fixed-length prosody embeddings best suited for same or similar-text prosody transfer, i.e., input text for conversion includes a similar number of syllables as a transcript of the reference audio signal. In this heuristic approach, prosody transfer precision is controlled by the dimensionality of the prosody embedding and choice of non-linearity (tan h vs. softmax). Referring to FIG. 6, another heuristic-based model 600 modifies the architecture of the deterministic reference encoder 500 by implementing a style token layer 610 disclosed by "Style Tokens: Unsupervised Style Modeling, Control and Transfer in End-to-End Speech Synthesis", arXiv preprint arXiv:1803.09017, Mar. 23, 2018, the contents of which are incorporated by reference in their entirety. Here, the style token layer 610 receives the prosody embedding $P_E$ 550 output from the deterministic reference encoder 500 and uses the prosody embedding $P_E$ 550 as a query vector to an attention module 612 configured to learn a similarity measure between the prosody embedding $P_E$ 550 and each token 614 in a bank of randomly initialized embeddings 614, 614a-n (also referred to as global style tokens (GSTs) or token embeddings). The set of token embeddings (also referred to as "style tokens") 614 is shared across all training sequences. Thus, the attention module 612 outputs a set of combination weights 616, 616a-n that represent the contribution of each style token 614 to the encoded prosody embedding $P_E$ 550. The weighted sum of token embeddings corresponds to a style embedding $P_E$ 650 that is input to the text encoder (e.g., encoder 452, 112) of the TTS model 450 for conditioning at every time step.

During inference, the text encoder of the ITTS model 450 may be directly conditioned on a specific token/style embedding 614 (e.g., Token B) to allow for style control and manipulation without a reference audio signal 412. On the other hand, when a reference audio signal 412 for a target speaker is used whose transcript does not match input text 104 to be synthesized into synthesized speech 480, the style token layer 610 is conditioned upon the reference audio signal 412 represented by the prosodic embedding $P_E$ 550 output from the reference encoder 500. The prosodic embedding $P_E$ 550, style embeddings 650, and tokens 615 affect information capacity of the respective embeddings and allow these heuristic-based models 500, 600 to target a specific trade-off between transfer precision (how closely the output resembles the references) and generality (how well an embedding works with arbitrary text).

In some implementations, embedding capacity of heuristic-based approaches, such as the deterministic reference encoder 500 of FIG. 5 and the heuristic-based model 600 of FIGS. 6A and 6B implementing the deterministic reference encoder 500 and the style token layer 610, is estimated by measuring a test-time reconstruction loss of the deterministic encoder 500. Specifically, these heuristic-based approaches may start with a teacher-forced reconstruction loss represented by Equation 1 (expressed below) to train their sequence-to-sequence model and then augment their model with the deterministic reference encoder 500 (denoted $g_e(x)$) represented by Equation 2 (expressed below). Equations 1 and 2 are expressed as follows:

$$L(x,y_T,y_S) = -\log p(x|y_T,y_S) = \|f_0(y_T,y_S) - x\|_1 + K \quad (1)$$

$$L'(x,y_T,y_S) = -\log p(x|y_T,y_S,g_e(x)) = \|f_0(y_T,y_S,g_e(x)) - x\|_1 + K \quad (2)$$

where x is an audio spectrogram 412, $y_T$ is the input text 104, $y_S$ is the target speaker (if training a multi-speaker model), $f_0(\bullet)$ is a deterministic function that maps the inputs to spectrogram predictions, and K is a normalization constant. Teacher-forcing implies that $f_0(\bullet)$ is dependent upon x when predicting spectrogram $x_t$. Because an $l_1$ reconstruction loss is typically used, the likelihood is equivalent to a Laplace random vector with fixed diagonal covariance and means provided by $f_0(\bullet)$ (though in practice, the deterministic output of $f_0(\bullet)$ serves as the output). Transfer is accomplished by pairing the embedding $P_E$ 550 computed by the reference encoder 500 with different text or speakers during synthesis.

Figure 7A:
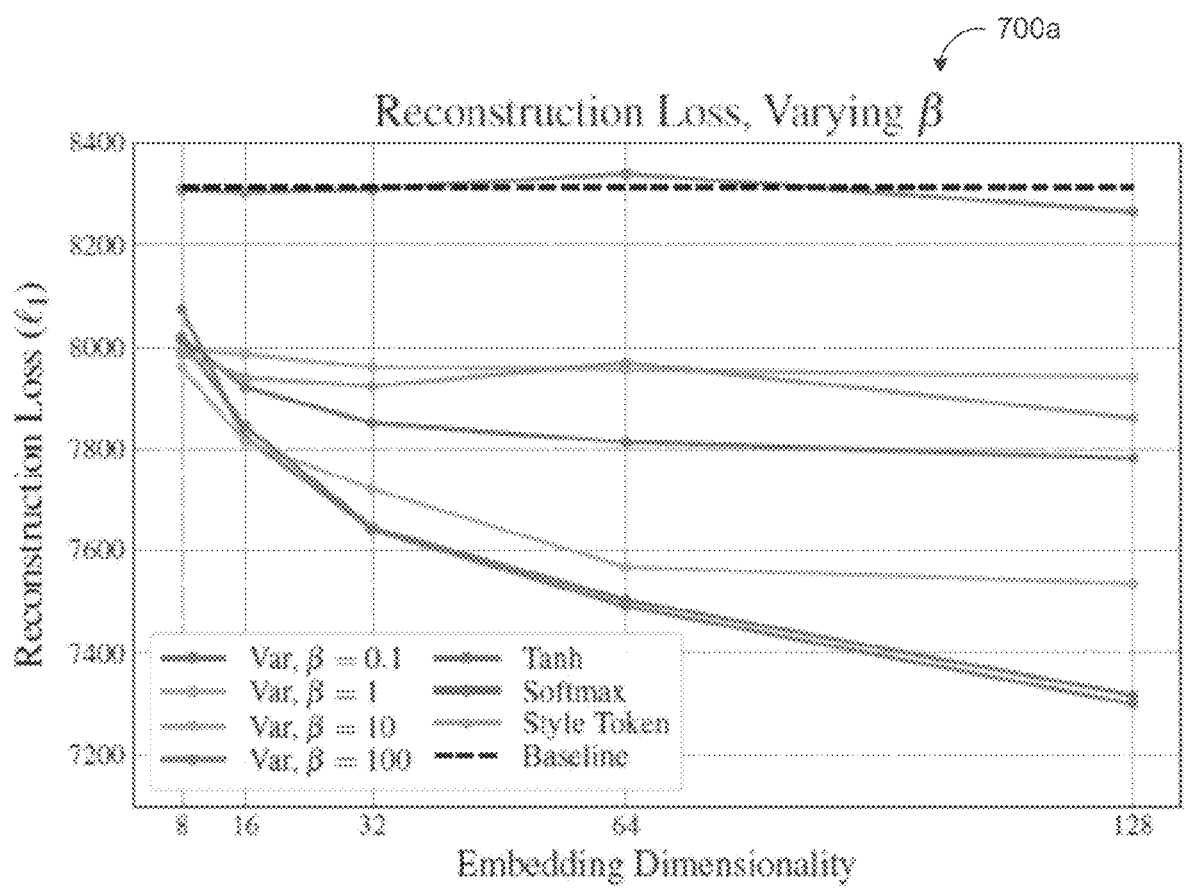
FIGS. 7A and 7B are example plot depicting reconstruction loss versus embedding dimensionality for deterministic embeddings
Figure 7B:
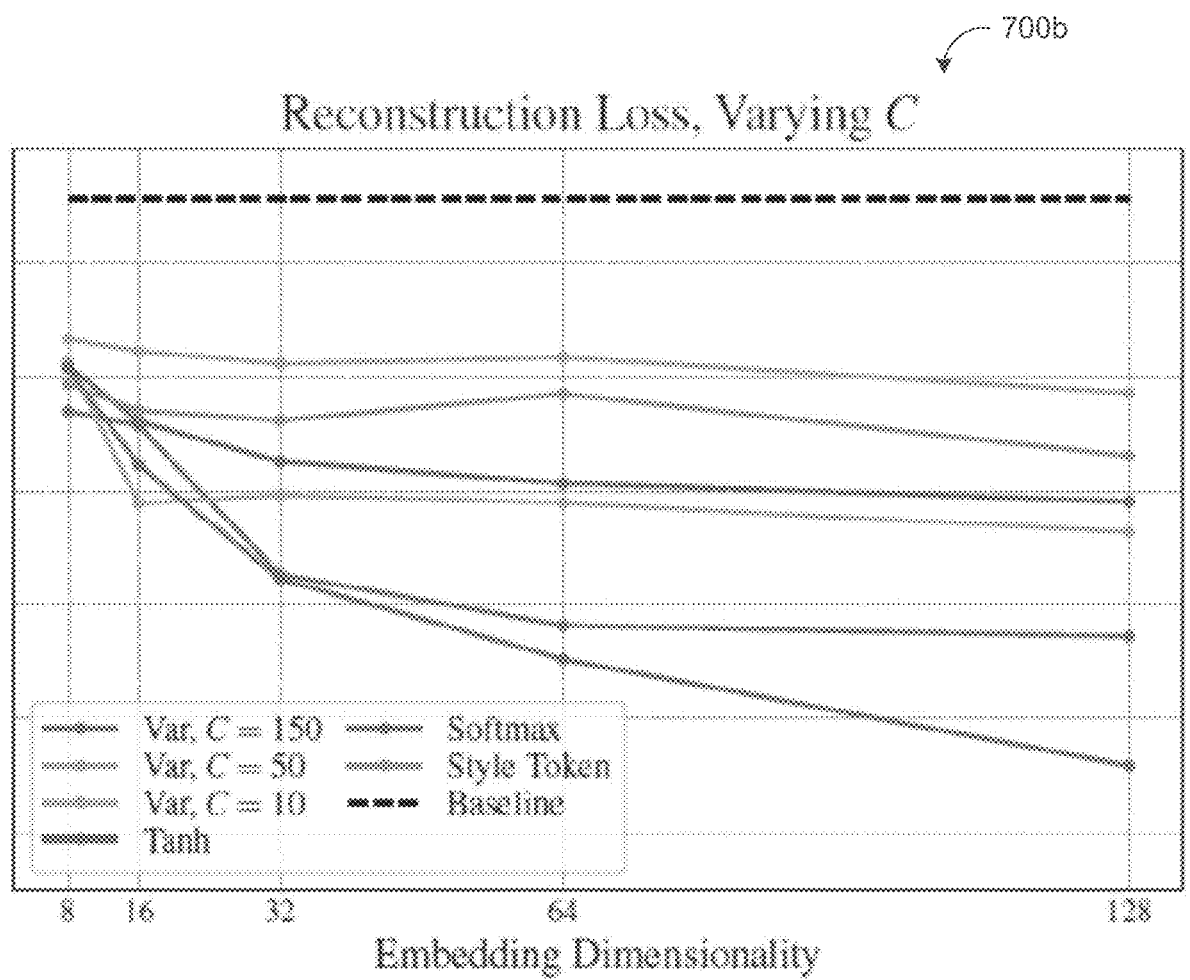

Referring to FIGS. 7A and 7B, plots 700a, 700b each show reconstruction loss $l_1$ (y-axis) varies with embedding dimensionality (x-axis) of the prosody embedding $P_E$ 550 and choice of non-linearity (tan h vs. softmax) for heuristic-based (e.g., non-variational) prosody transfer using the deterministic reference encoder 500. Here, the bottleneck of softmax non-linearity prosody embedding $P_E$ 550 is more severe than the tan h non-linearity prosody embedding. Similarly, plots 700a, 700b each show reconstruction loss $l_1$ (y-axis) varies with embedding dimensionality (x-axis) of the style embedding for heuristic-based style transfer. The more restrictive bottleneck of the style embedding (e.g., Style Token) compared to prosody embeddings shows how embedding capacity affects the precision, generality trade-off.

Referring back to FIGS. 7A and 7B, plot 700a further depicts reconstruction loss varying with embedding dimensionality for variational embeddings 420 with different KL weights, β, while plot 700b further depicts reconstruction loss varying with embedding dimensionality for variational embeddings 420 with different capacity limits, C, whereby the capacity limits are controlled via the KL term directly using Equation 9. Plot 700a shows that the reference decoder 410 using KL weight β=0.1 produces a variational embedding 420 that matches the loss of the tan h non-linearity prosody embedding from the heuristic-based prosody transfer model and using KL weight β=10 produces a variational embedding 420 similar to the style embedding. Further, using KL weight β=100 produces a variational embedding 420 with a loss very similar to a baseline of the TTS model 450 since capacity of the variational embedding 420 is effectively squashed to zero.

By specifying target capacities of the variational embeddings, one can estimate capacity of deterministic embeddings (prosody or style embeddings) computed by the deterministic reference encoder 500 via comparing/matching reconstruction loss measurements versus embedding dimensionality. Thus, with the ability to now estimate capacity of deterministic embeddings (also referred to as reference embeddings) output from the deterministic reference encoder based on the comparison of reconstruction loss vs embedding dimensionality relationship to variational embeddings with computable/controllable capacity, capacity of these deterministic embeddings can also be controlled by adjusting a dimension of the reference embeddings computed by the deterministic reference encoder. Thus, deterministic embeddings can now provide a tradeoff between precision/fidelity and generality/transferability using these techniques to estimate and control capacity.

Since the KL term corresponds to an upper bound on embedding capacity (Equation 8), a specific limit on the embedding capacity may be targeted by constraining the KL term using Equation 9 For instance, and with continued reference to FIGS. 7A and 7B, plot 700b shows that reconstruction loss flattens out when the embedding z reaches a certain dimensionality. This allows the reference encoder 410 to control a target representational capacity in the variational embedding 420 as long as the reference encoder has a sufficient structural capacity (at least C). In some examples, the variational embeddings 420 include fixed-length 128-dimensional embeddings to accommodate a range of targeted capacities for balancing the tradeoff between precision and generality. A number of bits in the variational embedding 421) may represent the capacity Thus during training of the transfer system 400, the capacity of the variational embedding 420 output from the reference encoder 410 may be controlled by using the upper bound (e.g., variational bound) corresponding to a KL term to control a quantity of information within the variational embedding 420. In this manner, desirable tradeoffs between precision and generality may be obtained by controlling the capacity of the variational embedding 420 alone and without requiring any altering of the architecture of the reference encoder to target specific precision/generality points.

Referring back to the transfer system 400 of FIG. 4, implementations herein are further directed toward estimating and quantifying the capacity of the variational embedding 420 output from the variational reference encoder 410 ('variational posterior') using an upper bound (i.e., a variational bound of the reference encoder 410) on representative mutual information. The reference encoder 410 may augment the reconstruction loss for the deterministic reference encoder 500 in Equation 2 with a KL term to align the variational reference encoder 410, $q(z|x)$, with a prior, $p(z)$, as represented by Equation 3 (expressed below). Equation 4 (expressed below) represents the overall loss of the reference encoder being equivalent to a negative lower bound (negative ELBO) of the representative mutual information corresponding to x, $y_T$, $y_S$. Equations 3 and 4 are expressed as follows.

$$L_{ELBO}(x,y_T,y_S)=E_{z\sim q(Z|X)}[-\log p(x|z,y_T,y_S)]+D_{KL}(q(z|x)\|p(z)) \quad (3)$$

$$-\log p(x|z,y_T,y_S)\leq L_{ELBO}(x,y_T,y_S) \quad (4)$$

In some examples, adjusting the KL term in Equation 3 controls capacity of the variational embedding 420 of the reference encoder 410, whereby the KL term provides an upper bound on the mutual information between the data, x, and the latent embedding, $z\sim q(z|x)$. This relationship between the KL term and the capacity of the variational embedding 420, z, is expressed as follows.

$$R^{AVG}=E_{x\sim PD(x)}[D_{KL}(q(z|x)\|p(z))], R=D_{KL}(q(z|x)\|p(z)) \quad (5)$$

$$I_q(X;Z)\equiv E_{x\sim PD(x)}[D_{KL}(q(z|x)\|p(z))], q(z)\equiv E_{x\sim PD(x)}q(z|x) \quad (6)$$

$$R^{AVG}=I_q(X;Z)+D_{KL}(q(z)\|p(z)) \quad (7)$$

$$\Rightarrow I_q(X;Z)\leq R^{AVG} \quad (8)$$

Where $p_D(x)$ is data distribution, R (e.g., "rate") is the KL term in Equation 3, $R^{AVG}$ is the KL term averaged over the data distribution, $I_q(X;Z)$ the representational mutual information that corresponds to the capacity of z, and $q(z)$ (e.g., aggregated posterior) is $q(z|x)$ marginalized over the data distribution. The bound in Equation 8 follows from Equation 7 and the non-negativity of the KL divergence, wherein Equation 7 shows that the slack on the bound is the KL divergence between the aggregated posterior, $q(z)$, and the prior, $p(z)$. In some examples, lowering R (e.g., the KL term) provides for better sampling of variational embeddings 420, z, from the model via the prior since samples of z that the decoder 456 sees during training will be substantially similar to samples from the prior.

In some implementations, a specific capacity of the variational embedding 420 is targeted by applying a Lagrange multiplier-based, dual-optimizer approach to the KL term rather than the reconstruction term. Applying the Lagrange multiplier-based, dual optimizer to the KL term may be expressed as follows:

$$\min_\theta \max_{\lambda\geq 0}\{E_{z\sim q_\theta(z|x)}[-\log p_\theta(x|z,y_T,y_S)]+\lambda(D_{KL}(q_\theta(z|x)\|p(z))-C\} \quad (9)$$

where $\theta$ denotes the model parameters, $\lambda$ is the Lagrange multiplier, and C denotes a capacity limit. By constraining $\lambda$ to be non-negative by passing an unconstrained parameter though a softplus non-linearity, the capacity constraint C corresponds to a limit/threshold rather than a target. As result, the optimization prevents attempts to increase the KL term by moving $q(z)$ away from $q(z)$. Advantageously, this dual optimizer approach is much less tedious than tuning the KL weight by hand, while at the same time, leads to more stable optimization compared to directly penalizing the $f_1$ reconstruction loss deviation from the target KL.

Referring back to FIGS. 7A and 7B, plot 700a further depicts reconstruction loss varying with embedding dimensionality for variational embeddings 420 with different KL weights, $\beta$, while plot 700b further depicts reconstruction loss varying with embedding dimensionality for variational embeddings 420 with different capacity limits, C, whereby the capacity limits are controlled via the KL term directly using Equation 9. Plot 700a shows that the reference decoder 410 using KL weight $\beta=0.1$ produces a variational embedding 420 that matches the loss of the tan h non-linearity prosody embedding from the heuristic-based prosody transfer model and using KL weight $\delta=10$ produces a variational embedding 420 similar to the style embedding. Further, using KL weight $\beta=100$ produces a variational embedding 420 with a loss very similar to a baseline of the TTS model 450 since capacity of the variational embedding 420 is effectively squashed to zero.

By specifying target capacities of the variational embeddings, one can estimate capacity of deterministic embeddings (prosody or style embeddings) computed by the deterministic reference encoder 500 via comparing/matching reconstruction loss measurements versus embedding dimensionality. Thus, with the ability to now estimate capacity of deterministic embeddings (also referred to as reference embeddings) output from the deterministic reference encoder based on the comparison of reconstruction loss vs embedding dimensionality relationship to variational embeddings with computable/controllable capacity, capacity of these deterministic embeddings can also be controlled by adjusting a dimension of the reference embeddings computed by the deterministic reference encoder. Thus, deterministic embeddings can now provide a tradeoff between precision/fidelity and generality/transferability using these techniques to estimate and control capacity.

Since the KL term corresponds to an upper bound on embedding capacity (Equation 8), a specific limit on the embedding capacity may be targeted by constraining the KL term using Equation 9. For instance, and with continued reference to FIGS. 7A and 7B, plot 700b shows that reconstruction loss flattens out when the embedding z reaches a certain dimensionality. This allows the reference encoder 410 to control a target representational capacity in the variational embedding 420 as long as the reference encoder has a sufficient structural capacity (at least C). In some examples, the variational embeddings 420 include fixed-length 128-dimensional embeddings to accommodate a range of targeted capacities for balancing the tradeoff between precision and generality. A number of bits in the variational embedding 420 may represent the capacity.

Thus during training of the transfer system 400, the capacity of the variational embedding 420 output from the reference encoder 410 may be controlled by using the upper bound (e.g., variational bound) corresponding to a KL term to control a quantity of information within the variational embedding 420. In this manner, desirable tradeoffs between precision and generality may be obtained by controlling the capacity of the variational embedding 420 alone and without requiring any altering of the architecture of the reference encoder to target specific precision/generality points.

Referring back to FIG. 4, in some implementations, conditional dependencies 416 are input to the reference encoder 410 to balance the tradeoff between precision and generalization. The conditional dependencies 416 include reference text, $y_T$, and/or reference speaker, $y_S$. By applying the reference speaker, an identity of a target speaker may be preserved in synthesized speech 480 so that the target speaker does not mimic a reference speaker having a different pitch range than the target speaker. During training, the reference text $y_T$ and the target text associated with the input text sequence 104 input to the encoder 452 are the same. Similarly, the reference speaker may also be input to the 452 to the encoder during training. However during inference, the reference text and target text may be different and/or the reference speaker and the target speaker may be different. For instance, the conditional dependencies 416 and reference audio signal 412 may be input to the reference encoder 410 to produce the variational embedding 420 having both prosody and style information. The input text sequence 104 input to the encoder 452 of the TTS model 450 may include target text $y_T$ that is different than the reference text y j to change what is said by the synthesized speech. Additionally or alternatively, a different target speaker may be input to the text encoder 452 of the TTS model 450 to change who spoke. Here, the variational embedding 420 is paired with the target text and/or the target speaker. As a result, this variational embedding 420 could be sampled at a later time when there is no reference audio signal but the conditional dependencies 416 match the target speaker and target text paired with the variational embedding 420.

Referring to FIG. 8A, a conditional generative model corresponding to the decoder 456 of the TTS model that produces an output/target audio signal X from a variational embedding z, target text $y_T$, and a target speaker $y_S$. The conditional generative model is represented by the form $p(x|z, y_T, y_S) p(z)$. FIG. 8B shows a variational posterior missing the conditional dependencies present in FIG. 8A. FIG. 8C shows the variational posterior (e.g., reference encoder 410) including conditional posteriors to match the form of FIG. 8C. Here, the matching variational posterior of FIG. 8C. Speaker information is represented as learned speaker-wise embedding vectors, while the text information is summarized into a vector by passing the output of the text encoder 452 through a unidirectional RNN. A simple diagonal Gaussian may be used for the approximate posterior, $q(z|x; y_T, y_S)$ and a standard normal distribution for the prior, $p(z)$. These distributions are chosen for simplicity and efficiency, but more powerful distributions such as Gaussian mixtures and normalizing flows could be used.

Generally, while a variational embedding 420 fully specifies variation of the prosodic and style information, the synthesized speech 480 based on the variational embedding 420 will always sound the same with the same input text sequence 104 even though there are an infinite number of ways the input text sequence 104 can be expressed for a given style. In some implementations, decomposing the variational embedding z 420 into hierarchical fractions $z_s$, $z_p$ allows one to specify how a joint capacity, $I_q(X; [Z_s, Z_p])$, is divided between the hierarchical fractions $z_s$, $z_p$. In some examples, the hierarchical fraction $z_s$ represents style information associated with the variational embedding z and the hierarchical fraction $z_p$ represents prosodic information associated with the variational embedding z. However, the hierarchical fractions decomposed may be used to denote other types of information without departing from the scope of the present disclosure.

Equation 8 shows the KL term providing the upper bound on capacity $I_q(X;Z)$. The following equations may be used to derive capacity of the prosodic fraction $z_p$ as follows:

$$I_q(X;[Z_s,Z_p]) \leq R^{AVG} \tag{10}$$

$$I_q(X;[Z_s,Z_p]) = I_q(X;Z_p) + I_q(X;Z_s|Z_p) = I_q(X;Z_p) \tag{11}$$

$$\Rightarrow I_q(X;Z_p) \leq R^{AVG} \tag{12}$$

The following equations may be used to derive capacity of the style fraction $z_s$ as follows.

$$I_q(Z_p; Z_s) \leq E_{z_p \sim q(z_p)}[D_{KL}(q(z_s|z_p) \| p(z_s))] \tag{13}$$

$$\equiv R_s^{AVG} \tag{14}$$

$$I_q(X; Z_s) \leq I_q(Z_p; Z_s) \tag{15}$$

$$\Rightarrow I_q(X; Z_s) \leq R_s^{AVG} \tag{16}$$

where $R_s$ makes up a portion of the overall joint KL term if $R_p = R - R_s$, the following bounds include.

$$\Rightarrow I_q(X;Z_s) \leq R^{AVG}, I_q(X;Z_p) \leq R_s^{AVG} + R_p^{AVG} \tag{17}$$

In order to specify how joint capacity is distributed between the fractions (e.g., latent variables), Equation 9 is extended to have two Lagrange multipliers and capacity targets as follows $$\min_{\theta} \max_{\lambda_s, \lambda_p \geq 0} \{ E_{z_p \sim q_\theta(z_p|x, y_T, y_S)}[-\log p_\theta(x|z_p, y_T, y_S)] + \tag{19}$$

$$\lambda_s(R_s - C_s) + \lambda_p(R_p - C_p) \}$$

where capacity target Cs limits information capacity of $z_s$ and Cp limits how much capacity $z_p$ has in excess of $z_s$, wherein the total capacity of $z_p$ is capped at Cs+Cp. In some examples, a reference hierarchical fraction $z_s$ is inferred by the reference encoder 410 from a reference audio signal 412 and used to sample multiple realizations. Untuitively, the higher Cs is, the more the output will resemble the reference, and the higher Cp is, the more variation from sample to sample for the same reference hierarchical fraction $z_s$.

With reference to FIGS. 4, 9A, and 9B, in some implementations, when only conditional dependencies 416 of reference text VT and reference speaker $y_S$ are input to the reference encoder 410 without reference audio signal 412, the $z_s$ is sampled from a train model, and $z_p$ is sampled and sent to decoder of FIG. 9A along with the conditional dependencies to compute the target output audio X. The sampled $z_p$ is paired as a prior with the conditional dependencies 416. Here, using the same conditional dependencies 416 of reference text $y_T$ and reference speaker $y_S$, the variational reference decoder (variational posterior) of FIG. 9B will output this $z_p$ and use the $z_p$ to compute $z_s$. As such, the decoder of FIG. 9A may now regenerate the target audio signal X using the computed $z_s$, the reference text $y_T$, and the reference speaker $y_S$ as inputs. Advantageously, the hierarchal fraction $z_s$ represents variation in the reference encoder specified by $z_s$ so that different capacities of $z_p$ can be sampled to result in synthesized speech of a given style sounding different. Thus, the $z_p$ and $z_p$ correspond to thresholds for balancing the tradeoff between precision and generalization. Accordingly, by using conditional dependencies 416, prior variational embeddings 420 learned by the reference encoder 410 may be sampled to synthesize speech without reference audio signals 412 and/or to sample prosodic characteristics from a distribution over likely prosodic realizations of an utterance with a specified style in order to provide natural variety across longer sections of speech.

Figure 10:
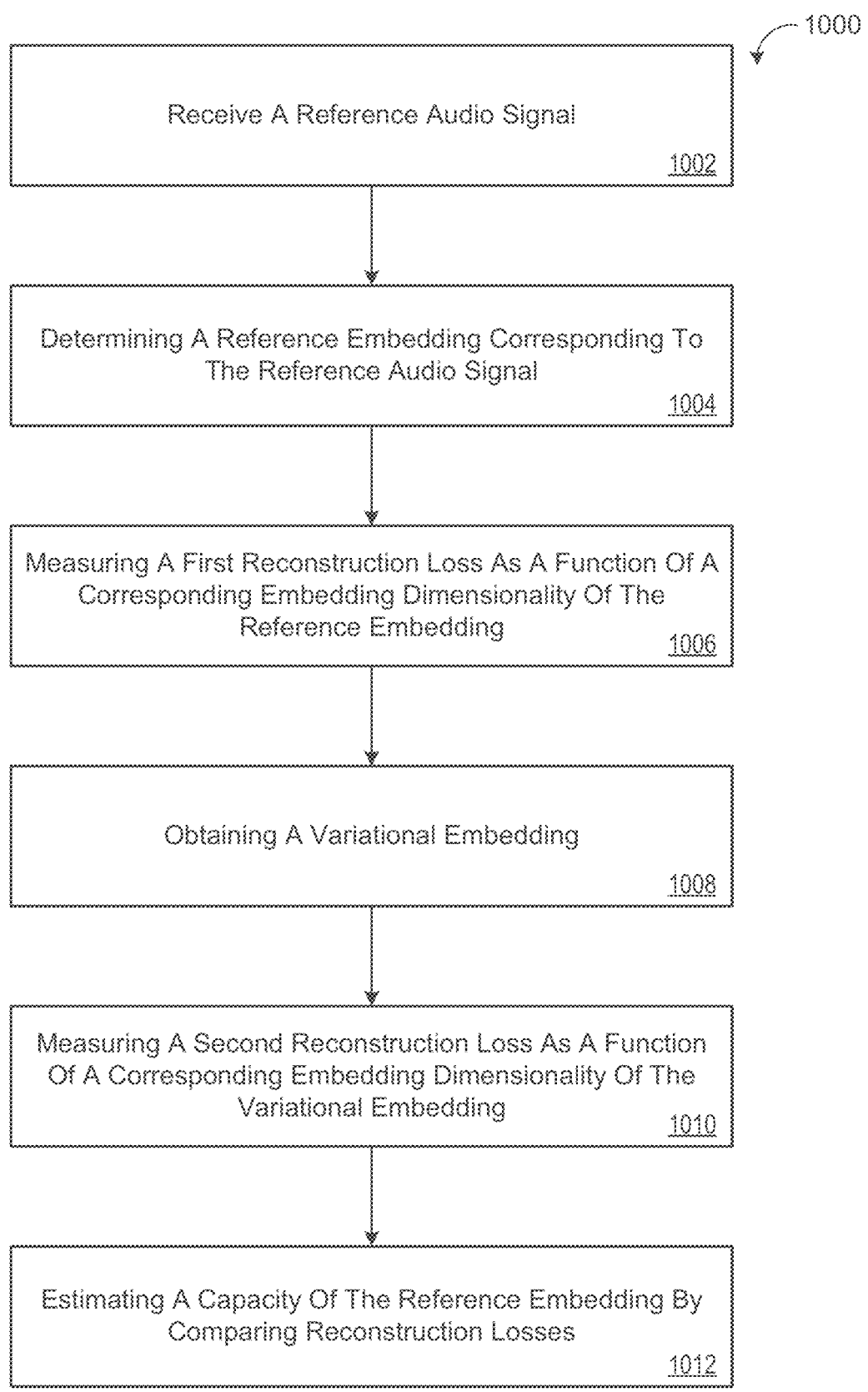
FIG. 10 is a flowchart of an example arrangement of operations fora method of estimating a capacity of a reference embedding.

FIG. 10 is a flowchart of an example arrangement of operations for a method 1000 of estimating a capacity of a reference embedding. At operation 1002, the method 1000 includes receiving, at a deterministic reference encoder 500, a reference audio signal 412, and at operation 1004, the method 1000 includes determining a reference embedding 550, 650 corresponding to the reference audio signal 412. Here, the reference embedding 550, 650 has a corresponding embedding dimensionality.

At operation 1006, the method 1000 includes measuring a reconstruction loss as a function of the corresponding embedding dimensionality of the reference embedding 550, 650. At operation 1008, the method 1000 includes obtaining a variational embedding 420 from a variational posterior. The variational embedding 420 has a corresponding dimensionality and a specified capacity, whereby the specified capacity is based on an adjustable variational bound of the variational posterior.

Figure 11:
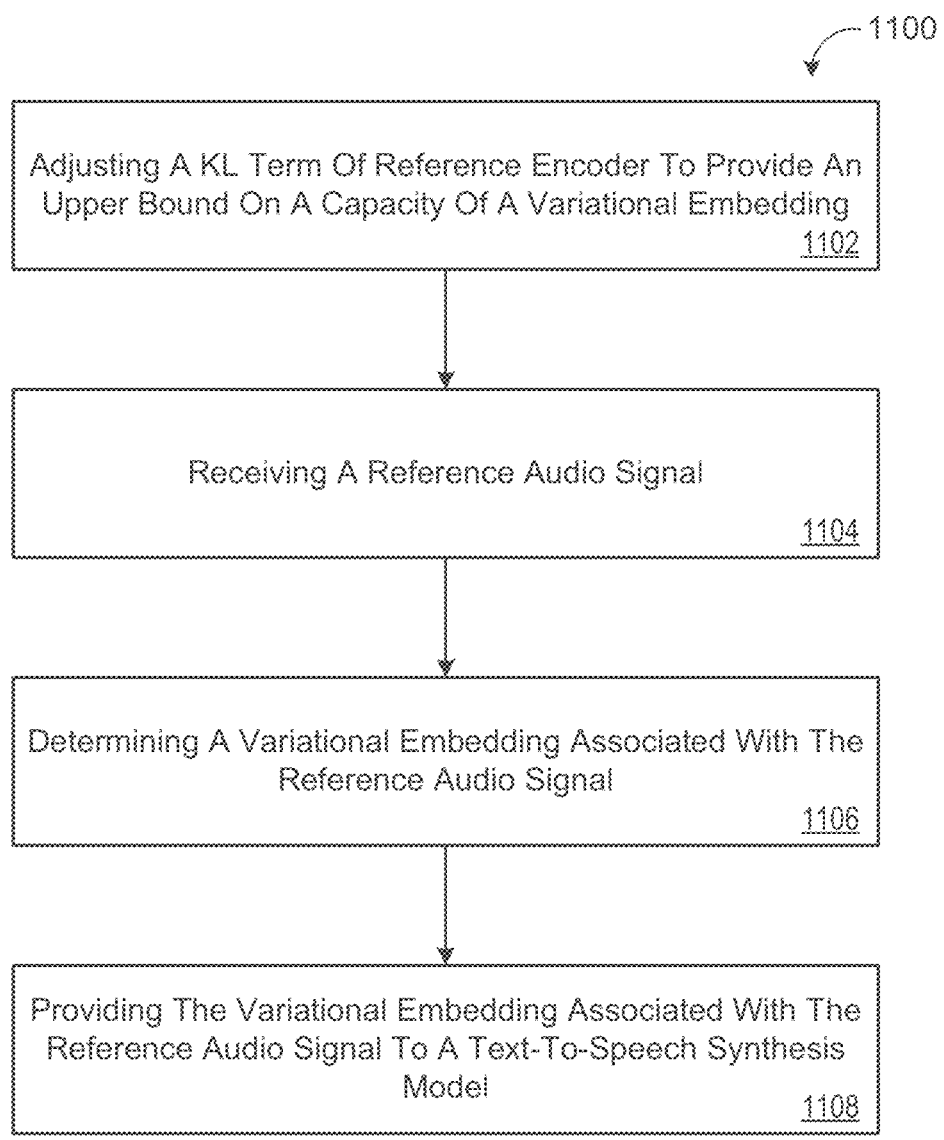
FIG. 11 is a flowchart of an example arrangement of operations for a method of targeting a specific capacity of a variational embedding.

At operation 1010, the method 1000 includes measuring reconstruction loss as a function of the corresponding embedding dimensionality of the variational embedding. At operation 1012, the method 1000 includes estimating a capacity of the reference embedding 550, 650 by comparing the measured reconstruction loss for the reference embedding 550, 650 relative to the measured reconstruction loss for the variational embedding 420 having the specified capacity FIG. 11 is a flowchart of an example arrangement of operations for a method 1100 of targeting a specific capacity of a variational embedding 420. At operation 1102, the method 1100 includes adjusting a KL term of a reference encoder 500 to provide an upper bound on a capacity of variational embedding 420 computed by the reference encoder 500. Adjusting the KL term may include increasing the KL term to increase the capacity of the variational embedding 420 or decreasing the KL term to decrease the capacity of the variational embedding. Increasing the capacity of the variational embedding increases precision of synthesized speech 480, while decreasing the capacity of the variational embedding 420 increases generality of the variational embedding for converting different input texts into synthesized speech 480. In some implementations, adjusting the KL term includes applying a Lagrange multiplier to the KL term and specifying a capacity limit. Adjusting the KL term may include tuning a weight of the KL term.

At operation 1104, the method 1100 includes receiving, at the reference encoder 500, a reference audio signal 412. At operation 1106, the method 1100 includes determining, by the reference encoder 500, a variational embedding 420 associated with the reference audio signal 412. The variational embedding 420 having a capacity bounded by the upper bound provided by the adjusted KL term. At operation 1108, the method 1100 includes providing the variational embedding 420 associated with the reference audio signal 412 to a text-to-speech synthesis model 450. Here, the text-to-speech synthesis model 450 is configured to convert input text 104 into synthesized speech 480 based on the variational embedding 420 associated with the reference audio signal 412. A number of bits represents the capacity of the variational embedding 420.

Figure 12:
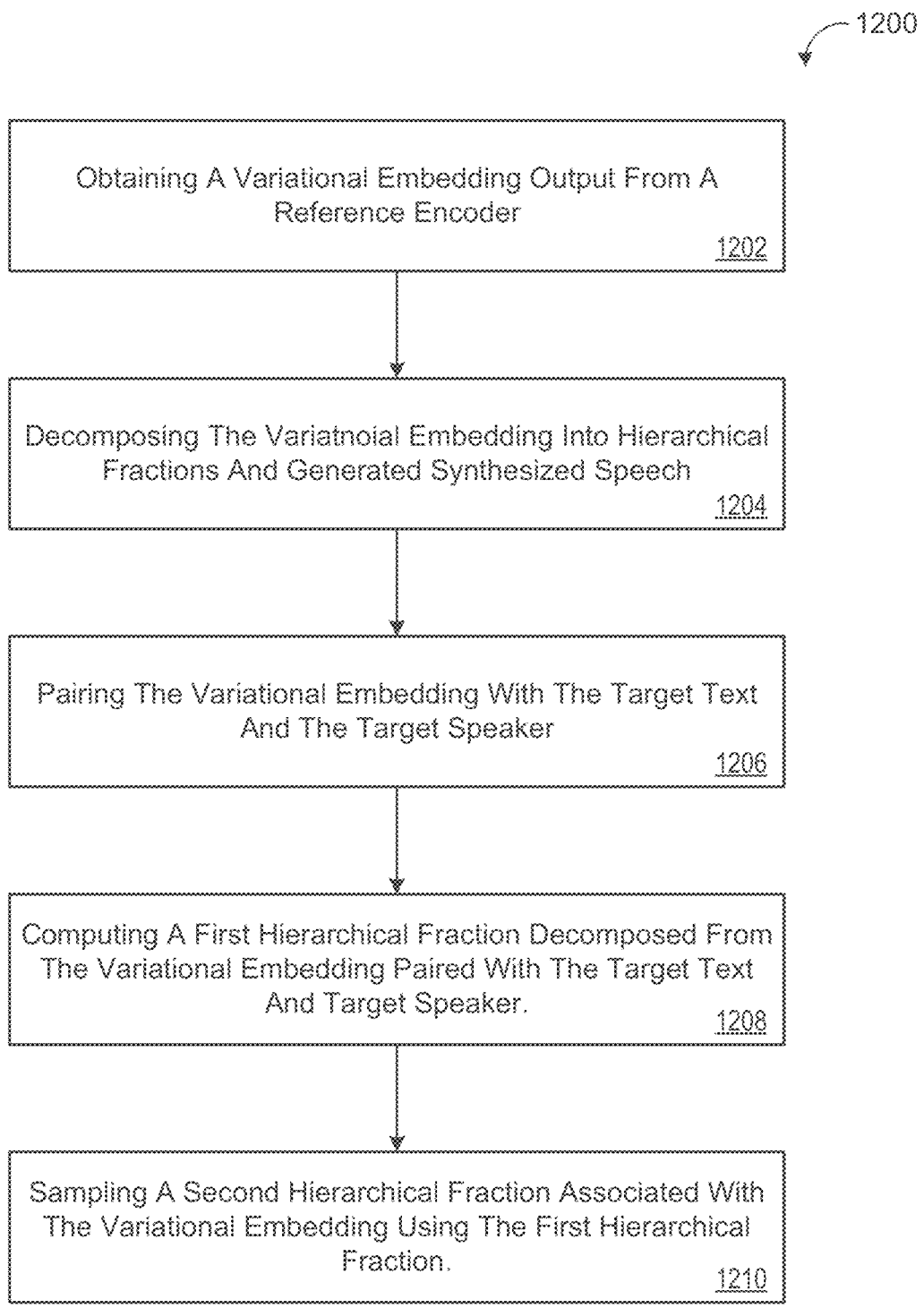
FIG. 12 is a flowchart of sampling hierarchical fractions associated with variational embeddings to vary how synthesized speech sounds for a given style.

FIG. 12 is a flowchart of an example arrangement of operations for a method 1200 of sampling hierarchical fractions associated with variational embeddings 420 to vary how synthesized speech sounds for a given style. The method 1200 may permit the controlling of a specified fraction of variation represented in the variational embedding 420 to allow a rest of variation to be sampled from a text-to-speech model 450. At operation 1202, the method 1200 includes obtaining a variational embedding 420 output from a reference encoder 500, and at operation 1204, the method 1200 includes decomposing the variational embedding into hierarchical fractions and generating synthesized speech 480 based on the variational embedding 420, target text, and a target speaker.

At operation 1206, the method 1200 includes pairing the variational embedding 420 with the target text and the target speaker. At operation 1208, the method 201200 includes receiving the target text and the target speaker at a reference encoder 500 without a reference audio signal and computing a first hierarchical fraction decomposed from the variational embedding paired with the target text and target speaker, the first hierarchical fraction providing a given style. At operation 1210, the method 1200 includes sampling a second hierarchical fraction associated with the variational embedding 420 using the first hierarchical fraction. Here, sampling the second hierarchical fraction varies how synthesized speech 480 sounds for the same given style.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory t RAM), dynamic random access memory (DRAM), static random access memory (SRAM), phase change memory (PCM) as well as disks or tapes.

Figure 13:
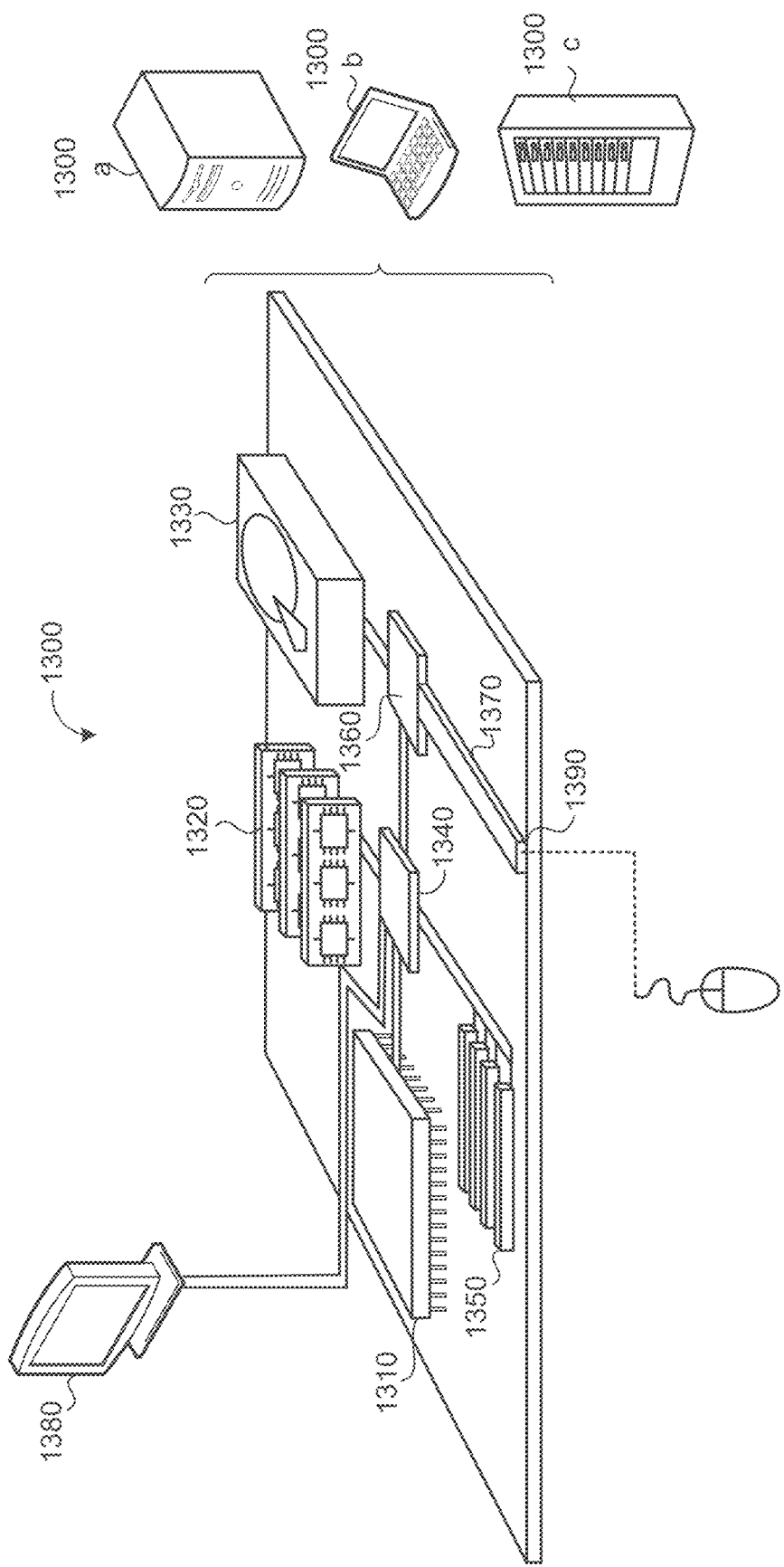
FIG. 13 is a schematic view of an example computing device that may be used to implement the systems and methods described herein.

FIG. 13 is schematic view of an example computing device 1300 that may be used to implement the systems and methods described in this document. The computing device 1300 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 1300 includes a processor 1310, memory 1320, a storage device 1330, a high-speed interface/controller 1340 connecting to the memory 1320 and high-speed expansion ports 1350, and a low speed interface/controller 1360 connecting to a low speed bus 1370 and a storage device 1330. Each of the components 1310, 1320, 1330, 1340, 1350, and 1360, are interconnected using various busses, and may be mounted on a common motherboard or in other manners as appropriate. The processor 1310 can process instructions for execution within the computing device 1300, including instructions stored in the memory 1320 or on the storage device 1330 to display graphical information for a graphical user interface (GUI) on an external input/output device, such as display 1380 coupled to high speed interface 1340. In other implementations, multiple processors and/or multiple buses may be used, as appropriate, along with multiple memories and types of memory. Also, multiple computing devices 1300 may be connected, with each device providing portions of the necessary operations (e.g., as a server bank, a group of blade servers, or a multi-processor system).

The memory 1320 stores information non-transitorily within the computing device 1300. The memory 1320 may be a computer-readable medium, a volatile memory unit(s), or non-volatile memory unit(s). The non-transitory memory 1320 may be physical devices used to store programs (e.g., sequences of instructions) or data (e.g., 1o program state information) on a temporary or permanent basis for use by the computing device 1300. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 1330 is capable of providing mass storage for the computing device 1300. In some implementations, the storage device 1330 is a computer-readable medium. In various different implementations, the storage device 1330 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 1320, the storage device 1330, or memory on processor 1310.

The high speed controller 1340 manages bandwidth-intensive operations for the computing device 1300, while the low speed controller 1360 manages lower bandwidth-intensive operations. Such allocation of duties is exemplary only. In some implementations, the high-speed controller 1340 is coupled to the memory 1320, the display 1380 (e.g., through a graphics processor or accelerator), and to the high-speed expansion ports 1350, which may accept various expansion cards (not shown). In some implementations, the low-speed controller 1360 is coupled to the storage device 1330 and a low-speed expansion port 1300. The low-speed expansion port 1390, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 1300 may be implemented in a number of different forms, as shown in the figure. For example, it may be implemented as a standard server 1300a or multiple times in a group of such servers 1300a, as a laptop computer 1300b, or as part of a rack server system 1300c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, soft are applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback. e.g., visual feedback, auditory feedback, or tactile feedback, and input from the user can be received in any form, including acoustic, speech, or tactile input. In addition, a computer can interact with a user by sending documents to and receiving documents from a device that is used by the user, for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method for estimating embedding capacity, the method comprising:
    receiving, at a deterministic reference encoder executing on data processing hardware, a reference audio signal;
    determining, by the data processing hardware, a reference embedding corresponding to the reference audio signal, the reference embedding having a corresponding embedding dimensionality;
    measuring, by the data processing hardware, a first reconstruction loss as a function of the corresponding embedding dimensionality of the reference embedding;
    obtaining, by the data processing hardware, a variational embedding from a variational posterior, the variational embedding having a corresponding embedding dimensionality and a specified capacity;
    measuring, by the data processing hardware, a second reconstruction loss as a function of the corresponding embedding dimensionality of the variational embedding;
    estimating, by the data processing hardware, a capacity of the reference embedding by comparing the first measured reconstruction loss for the reference embedding relative to the second measured reconstruction loss for the variational embedding having the specified capacity;
    updating, by the data processing hardware, the specified capacity of the variational embedding based on the estimated capacity of the reference embedding;
    providing, by the data processing hardware, the variational embedding having the updated specified capacity to a text-to-speech (TTS) model;
    receiving, at the TTS model, an input text sequence to be synthesized into speech associated with the reference audio signal; and
    generating, using the TTS model, a synthesized speech representation of the input text sequence based on the variational embedding having the updated specified capacity provided to the TTS model.

2. The method of claim 1, wherein the reference embedding comprises a tan h non-linearity prosody embedding.

3. The method of claim 1, wherein the reference embedding comprises a softmax non-linearity prosody embedding.

4. The method of claim 1, wherein the reference embedding comprises a style embedding.

5. The method of claim 1, wherein the specified capacity of the variational embedding is based on an adjustable variational bound of the variational posterior.

6. The method of claim 5, wherein the adjustable variational bound comprises an adjustable KL term, the adjustable KL term providing an upper bound on the variational embedding.

7. The method of claim 5 wherein the adjustable variational bound comprises a tunable KL weight, the tunable KL weight providing an upper bound on the variational embedding.

8. The method of claim 5, wherein increasing the adjustable variational bound increases the specified capacity of the variational embedding.

9. The method of claim 5, wherein decreasing the adjustable variational bound decreases the specified capacity of the variational embedding.

10. The method of claim 1, wherein the estimated capacity of the reference embedding is substantially equal to the capacity of the variational embedding when the first and second measured reconstruction losses match one another.

11. A system comprising:
    data processing hardware; and
    memory hardware in communication with the data processing hardware, the memory hardware storing instructions that when executed on the data processing hardware cause the data processing hardware to perform operations comprising:
        receiving, at a deterministic reference encoder, a reference audio signal;
        determining a reference embedding corresponding to the reference audio signal, the reference embedding having a corresponding embedding dimensionality;

measuring a first reconstruction loss as a function of the corresponding embedding dimensionality of the reference embedding;

obtaining a variational embedding from a variational posterior, the variational embedding having a corresponding embedding dimensionality and a specified capacity;

measuring a second reconstruction loss as a function of the corresponding embedding dimensionality of the variational embedding;

estimating a capacity of the reference embedding by comparing the first measured reconstruction loss for the reference embedding relative to the second measured reconstruction loss for the variational embedding having the specified capacity;

updating the specified capacity of the variational embedding based on the estimated capacity of the reference embedding;

providing the variational embedding having the updated specified capacity to a text-to-speech (TTS) model;

receiving, at the TTS model, an input text sequence to be synthesized into speech associated with the reference audio signal; and generating, using the TTS model, a synthesized speech representation of the input text sequence based on the variational embedding having the updated specified capacity provided to the TTS model.

12. The system of claim 11, wherein the reference embedding comprises a tan h non-linearity prosody embedding.

13. The system of claim 11, wherein the reference embedding comprises a softmax non-linearity prosody embedding.

14. The system of claim 11, wherein the reference embedding comprises a style embedding.

15. The system of claim 11, wherein the specified capacity of the variational embedding is based on an adjustable variational bound of the variational posterior.

16. The system of claim 15, wherein the adjustable variational bound comprises an adjustable KL term, the adjustable KL term providing an upper bound on the variational embedding.

17. The system of claim 15, wherein the adjustable variational bound comprises a tunable KL weight, the tunable KL weight providing an upper bound on the variational embedding.

18. The system of claim 15, wherein increasing the adjustable variational bound increases the specified capacity of the variational embedding.

19. The system of claim 15, wherein decreasing the adjustable variational bound decreases the specified capacity of the variational embedding.

20. The system of claim 11, wherein the estimated capacity of the reference embedding is substantially equal to the capacity of the variational embedding when the first and second measured reconstruction losses match one another.

* * * * *